United States Patent
Lappeteläinen

(10) Patent No.: US 7,046,644 B1
(45) Date of Patent: *May 16, 2006

(54) ADAPTIVE TRANSMISSION CHANNEL ALLOCATION METHOD AND SYSTEM FOR ISM AND UNLICENSED FREQUENCY BANDS

(75) Inventor: Antti Lappeteläinen, Espoo (FI)

(73) Assignee: Nokia Mobile Phones Ltd., Espoo (FI)

( * ) Notice: Subject to any disclaimer, the term of this patent is extended or adjusted under 35 U.S.C. 154(b) by 482 days.

This patent is subject to a terminal disclaimer.

(21) Appl. No.: 09/722,604

(22) Filed: Nov. 27, 2000

(51) Int. Cl.
*H04J 3/16* (2006.01)
*H04J 3/22* (2006.01)
*H04B 7/216* (2006.01)

(52) U.S. Cl. ............. 370/329; 370/335; 370/342; 370/465

(58) Field of Classification Search ........ 370/311, 370/315, 326, 329–335, 342–347, 338, 459–465, 370/468, 478, 479; 375/132–138, 202, 227, 375/295, 341, 342; 455/226, 410, 426, 517, 455/422, 569, 436–452; 398/59, 82, 83; 376/230.1, 332, 395; 709/228, 229
See application file for complete search history.

(56) References Cited

U.S. PATENT DOCUMENTS

| | | | |
|---|---|---|---|
| 5,193,102 A | | 3/1993 | Meidan et al. ............. 375/1 |
| 5,528,623 A * | | 6/1996 | Foster, Jr. ................ 375/133 |
| 5,586,120 A * | | 12/1996 | Cadd ........................ 370/468 |
| 5,696,903 A * | | 12/1997 | Mahany ..................... 709/228 |
| 5,809,059 A * | | 9/1998 | Souissi et al. .............. 375/202 |
| 5,818,828 A * | | 10/1998 | Packer et al. .............. 370/346 |
| 5,949,776 A * | | 9/1999 | Mahany et al. ............. 370/338 |
| 6,130,885 A * | | 10/2000 | Izumi et al. ................ 370/343 |
| 6,240,125 B1 | | 5/2001 | Andersson et al. ......... 375/132 |
| 6,275,500 B1 * | | 8/2001 | Callaway et al. ........... 370/449 |
| 6,321,095 B1 * | | 11/2001 | Gavette ...................... 455/517 |
| 6,327,300 B1 * | | 12/2001 | Souissi et al. .............. 375/219 |
| 6,377,608 B1 * | | 4/2002 | Zyren ......................... 375/132 |
| 6,400,751 B1 * | | 6/2002 | Rodgers ..................... 375/132 |
| 6,405,027 B1 * | | 6/2002 | Bell ............................ 455/403 |
| 6,405,048 B1 * | | 6/2002 | Haartsen .................... 455/464 |
| 6,553,060 B1 * | | 4/2003 | Souissi et al. .............. 375/219 |
| 6,594,302 B1 * | | 7/2003 | Lansford .................... 375/133 |
| 6,619,460 B1 * | | 9/2003 | Carlsson et al. ........ 192/219.5 |
| 6,643,278 B1 * | | 11/2003 | Panasik et al. ............. 370/330 |
| 6,751,251 B1 * | | 6/2004 | Lansford .................... 375/133 |
| 6,760,317 B1 * | | 7/2004 | Honkanen et al. ......... 370/329 |
| 6,778,831 B1 * | | 8/2004 | Sancho et al. ............. 455/436 |
| 2002/0009158 A1 * | | 1/2002 | Souissi et al. .............. 375/295 |
| 2002/0075941 A1 * | | 6/2002 | Souissi et al. .............. 375/133 |

FOREIGN PATENT DOCUMENTS

| | | |
|---|---|---|
| EP | 1039655 | 9/2000 |
| WO | 0203627 | 1/2002 |

* cited by examiner

*Primary Examiner*—Man U. Phan
(74) *Attorney, Agent, or Firm*—Ware, Fressola, Van Der Sluys & Adolphson LLP

(57) ABSTRACT

A method and system for establishing a non-frequency-hopping connection link between a slave device with another slave device in a communications network having a plurality of frequency channels within a radio frequency band known as the unlicensed ISM band, wherein the connection links between slave devices are capable of being carried out in a frequency-hopping fashion. The non-frequency-hopping connection link can be established after the channel conditions, including the carrier power of the channel and the interference and noise levels adversely affecting the connection link, are measured.

23 Claims, 21 Drawing Sheets

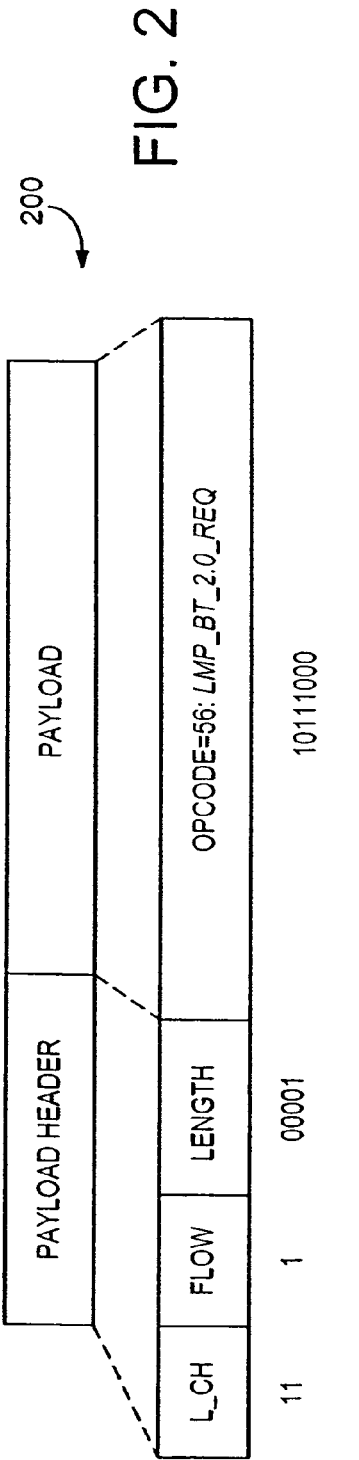
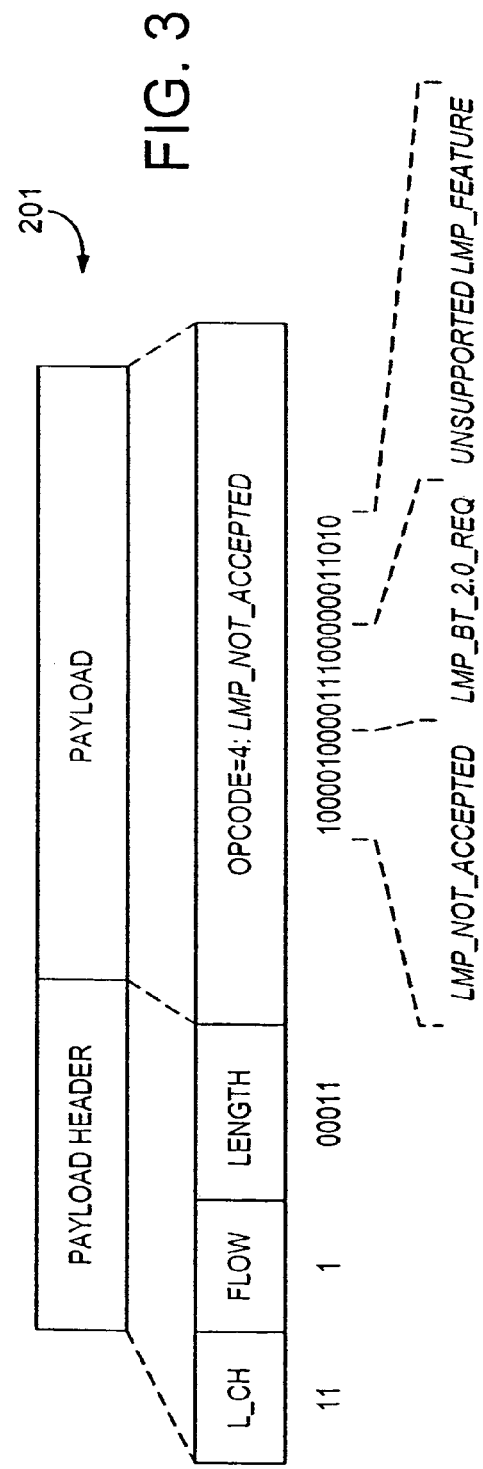

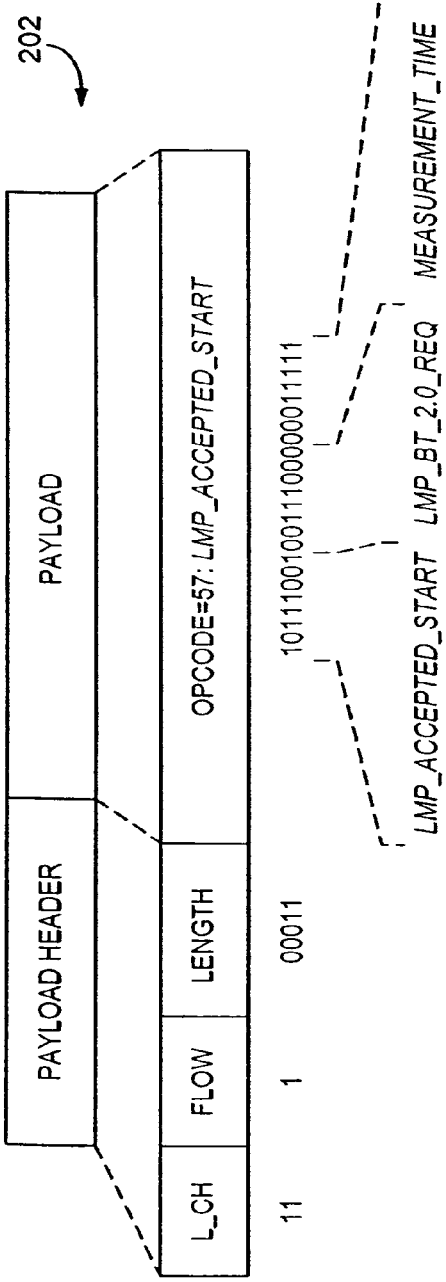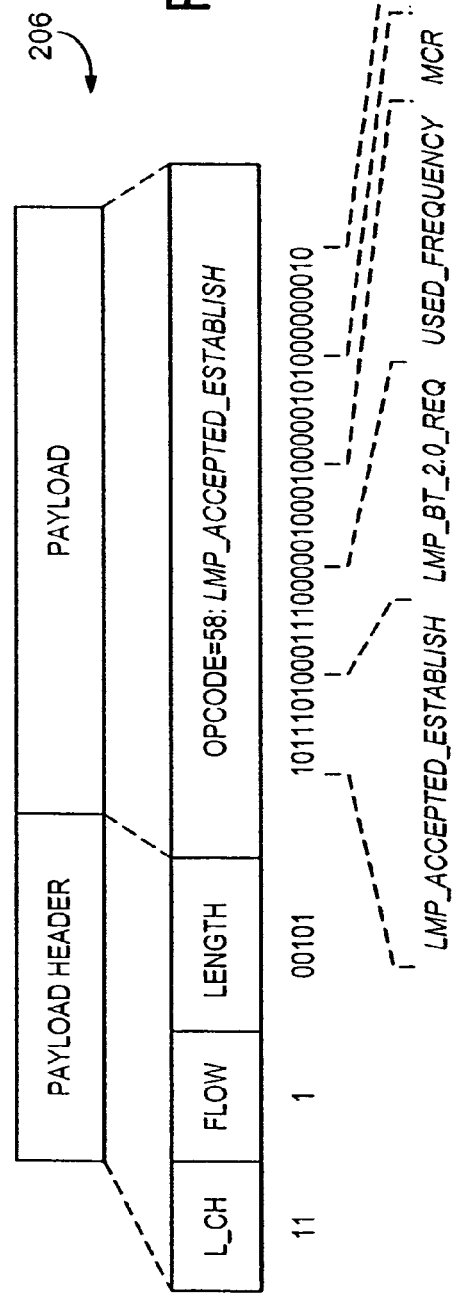

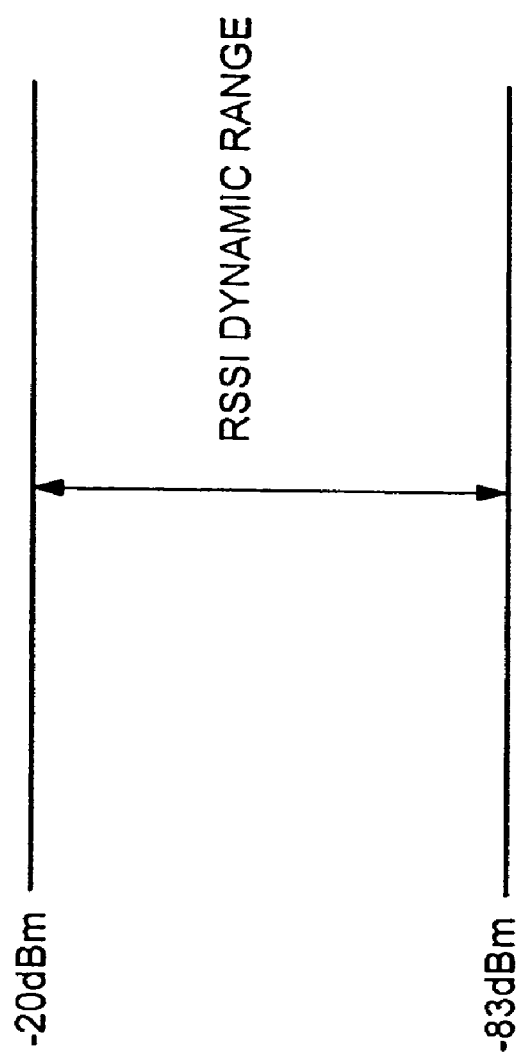

ADAPTIVE TRANSMISSION CHANNEL ALLOCATION METHOD AND SYSTEM FOR ISM AND UNLICENSED FREQUENCY BANDS

CROSS-REFERENCE TO RELATED APPLICATION

Reference is made to application Ser. No. 09/610,758, entitled "Adaptive Transmission Channel Allocation Method and System for ISM and Unlicensed Frequency Bands" by Mauri Honkanen, Antti Lappeteläinen and Arto Palin, assigned to the assignee of this application and filed on Jul. 6, 2000.

FIELD OF THE INVENTION

The present invention relates generally to a so-called Bluetooth communications system operating at radio frequencies around 2.45 GHz and, more particularly, to the allocation of an adaptive transmission channel in a piconet operating in the Bluetooth radio frequency band.

BACKGROUND OF THE INVENTION

A Bluetooth system provides a communication channel between two electronic devices via a short-range radio link. In particular, the Bluetooth system operates in the radio frequency range around 2.45 GHz in the unlicensed Industrial-Scientific-Medical (ISM) band. The Bluetooth radio link is intended to be a cable replacement between portable and/or fixed electronic devices. The portable devices include mobile phones, communicators, audio headsets, laptop computers, other GEOS-based or palm OS-based devices and devices with different operating systems.

The Bluetooth operating frequency is globally available, but the permissible bandwidth of the Bluetooth band and the available RF channels may be different from one country to another. Globally, the Bluetooth operating frequency falls within the 2400 MHz to 2497 MHz range. In the U.S. and in Europe, a band of 83.7 MHz bandwidth is available, and the band is divided into 79 RF channels spaced 1 MHz apart. Bluetooth network arrangements can be either point-to-point or point-to-multipoint to provide connection links among a plurality of electronic devices. Two to eight devices can be operatively connected into a piconet, wherein, at a given period, one of the devices serves as the master while the others are the slaves. Several piconets may form a larger communications network known as a scattemet, with each piconet maintaining its independence. The baseband protocol for a Bluetooth system combines circuit and packet switching. Circuit switching can be either asynchronous or synchronous. Up to three synchronous data (logical) channels, or one synchronous and one asynchronous data channel, can be supported on one physical channel. Each synchronous channel can support a 64 Kb/s transfer rate while an asynchronous channel can transmit up to 721 Kb/s in one direction and 57.6 Kb/s in the opposite direction. If the link is symmetric, the transfer rate in the asynchronous channel can support 432.6 Kb/s. A typical Bluetooth system consists of a radio link, a link control unit and a support unit for link management and host terminal interface functions. The Bluetooth link controller carries out the baseband protocols and other low-level routines. Link layer messages for link set-up and control are defined in the Link Manager Protocol (LMP). In order to overcome the problems of radio noise interference and signal fading, frequency hopping is currently used to make the connections robust.

Currently, each of the 79 RF channels is utilized by a pseudo-random hopping sequence through the Bluetooth bandwidth. The hopping sequence is unique for each piconet and is determined by the Bluetooth device address of the master whose clock is used to determine the phase of the hopping sequence. The channel is divided into time slots of 625 μs in length and numbered according to the master clock, wherein each time slot corresponds to an RF hop frequency, and wherein each consecutive hop corresponds to a different RF hop frequency. The nominal hop rate is 1600 hops/s. All Bluetooth devices participating in the piconet are time and hop synchronized to the channel. The slot numbering ranges from 0 to $2^{27}-1$ and is cyclic with a cycle length of $2^{27}$. In the time slots, master and slave devices can transmit packets. Packets transmitted by the master or the slave device may extend up to five time slots. The RF hop frequency remains fixed for the duration of packet transmission.

The ISM frequency bands can be used by many different devices, which include wireless local area networks (WLANs), microwave ovens, and lighting equipment. The interference caused by these multiple different applications is inherent to almost any device, which is connected to the piconet. Currently, the usage of ISM frequency bands is growing very fast. In order to survive in these frequency bands, new wireless communication systems must utilize a robust modulation scheme with a certain method of channel allocation. For example, WLAN systems are using a Frequency Hopping Spread Spectrum (FHSS) method, in which transmission takes place only a short time in each channel, and Direct Sequence Spread Spectrum (DSSS) modulation, which overcomes narrow-band interference by spreading. However, in these systems the allocation of channels, or channelization, is organized by using either a carrier sensing (CS) method or a Code Division Multiple Access (CDMA) method. In the CS method, each of the channels which are to be used are measured in order to determine whether a transmission is taking place in that channel. If the channel under measurement does not have an ongoing transmission, then the channel can be used for hopping. The major problem with the carrier sensing method is that the measurement is ineffective for the traffic type that uses a different modulation method. In the CDMA method, while the narrow-band interferer is spread in the receiver, the received noise is actually increased, thereby reducing the noise margin of the system. Optionally, it is also possible to establish virtual traffic channels by using different hopping frequencies. However, this does not avoid the parts of the spectrum where the interference occurs.

It is advantageous and desirable to provide a method and system for making connections between devices operating in the ISM bands by effectively avoiding the parts of the spectrum where channel conditions such as interference and noise levels may adversely affect the channel connection.

SUMMARY OF THE INVENTION

The primary objective of the present invention is to provide a method and system to ensure the backward compatibility of a piconet device, which is capable of operating in the non-frequency-hopping fashion (BT 2.0) in an environment where the frequency-hopping fashion (BT 1.0) is also used. The backward compatibility ensures that a BT 2.0 device is compatible with a BT 1.0 device.

Accordingly, the present invention provides a method for establishing a connection link in a communications network having a master device and a plurality of slave devices, wherein the communications network has a plurality of frequency channels within a radio frequency band for establishing the connection link, and wherein the connection link between the master device and the slave devices and the connection link among the slave devices are capable of being carried out in a frequency-hopping fashion. The method comprises the steps of:

establishing a non-frequency-hopping connection link between a first slave device and a second slave device if a communication channel for the non-frequency-hopping connection link is available; and establishing or maintaining the connection link in the frequency-hopping fashion if the communication channel for the non-frequency-hopping connection link is unavailable.

Preferably, the method further comprises the step of measuring channel conditions in at least a portion of the plurality of frequency channels for determining whether the communications channel for the non-frequency-hopping connection link is available.

Preferably, the channel conditions include the carrier power of the channel and the interference and noise levels affecting the non-frequency-hopping connection link. Preferably, the measurement of channel conditions is carried out by the first slave device. However, it is also possible that the measurement of channel conditions be second slave device or the master device.

Preferably, the method also includes the step of sending to the first slave devices a plurality of measurement parameters including measurement time and frequencies to be measured in order for the first slave device to measure the channel conditions based on the measurement parameters.

Preferably, the method also includes the step of providing the master device a measurement report including results of the channel condition measurements.

Preferably, the method further comprises the step of selecting a frequency channel for establishing the non-frequency-hopping connection link based on the measurement results.

Preferably, the method further comprises the step of providing the first and second slave devices a plurality of channel parameters including the selected frequency. The channel parameters also include a modulation rate and a quality of service requirement.

Preferably, whether the communication link for the non-frequency-hopping fashion between the first and second slave devices is available is also determined based on the transmission power of the first and second slave devices.

Upon establishing the non-frequency-hopping connection link with the first and second slave devices, the master device can give up or retain its role as a master device to the first and/or second slave devices.

The present invention also provides a system for adaptive allocation of transmission channels in order to establish a connection link in a communications network having a master device and a plurality of slave devices, wherein the communications network has a plurality of frequency channels within a radio frequency band for establishing the connection link, and wherein the connection link between the master device and the plurality of slave devices and the connection link among the slave devices are capable of being carried out in a frequency-hopping fashion and wherein the adaptive allocation is carried out to establish a non-frequency-hopping connection link between a first slave device and a second slave device. The system comprises:

a first mechanism for determining whether a communication channel for the non frequency hopping connection link is available;

a second mechanism to establish the non-frequency-hopping connection link between the first slave device and the second slave device if the non-frequency-hopping connection link is available; and a third mechanism to establish or maintain a frequency-hopping connection link between the first slave device and the master device and between the second slave device and the master device if the non frequency hopping connection link is not available.

The present invention will become apparent taken in conjunction with FIGS. 1a to 16.

BRIEF DESCRIPTION OF THE DRAWINGS

FIG. 2 is a frame structure illustrating an exemplary PDU (Protocol Data Unit) for a slave device to request a BT 2.0 connection link with another slave device.

FIG. 3 is a frame structure illustrating an exemplary PDU format used as an LMP_not_accepted response.

FIG. 4 is a frame structure illustrating an exemplary PDU format used as an LMP_accepted_start response.

FIG. 5 is a frame structure illustrating an exemplary PDU format used as an LMP_accepted_establish response.

FIG. 13 is a diagrammatic representation illustrating an example of an RSSI dynamic range.

DETAILED DESCRIPTION

Figure 1A:
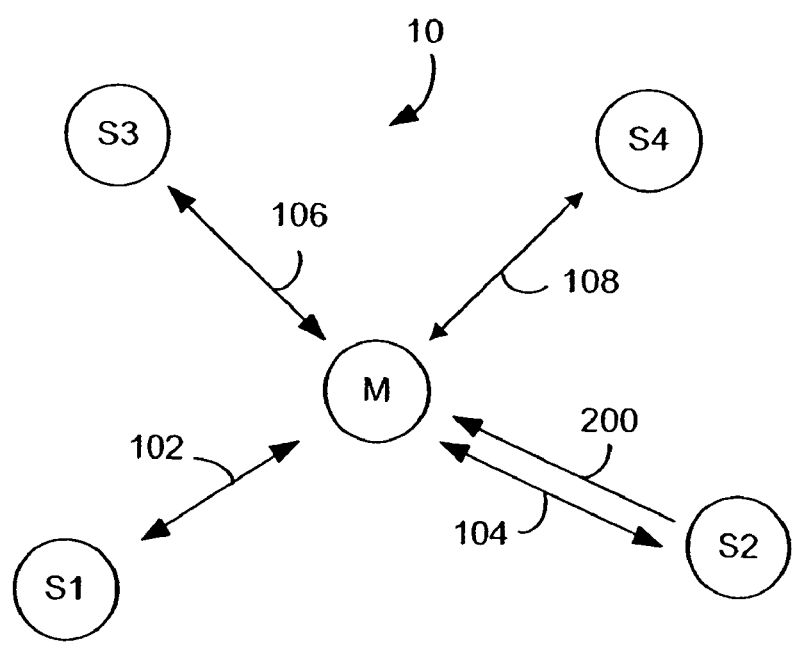
FIG. 1a is a diagrammatic representation illustrating the establishment procedure of a connection link in a piconet wherein a slave device sends a request to the master device requesting a BT 2.0 connection link with another slave device.

FIGS. 1a through 1g are diagrammatic representations illustrating the establishment procedure of a connection link in a piconet 10 having a plurality of devices M, S1, S2, S3 and S4 which are capable of being connected in a frequency-hopping fashion. The frequency-hopping connection links are well known in the art, and such a connection is referred to herein as a BT 1.0 connection link, associated with the Bluetooth Specification Version 1.0 (BT 1.0). As shown, M is currently a master device and S1, S2, S3 and S4 are slave devices. The procedure described here is limited to the case where a slave device wishes to establish a connection link with another slave device in a non-frequency-hopping fashion. The non-frequency-hopping fashion is herein referred to as BT 2.0. As shown in FIG. 1a, the connection links 102, 104, 106 and 108 between the master device M and the slave devices S1, S2, S3 and S4 are initially established according to the BT 1.0 fashion. At any time, any one of the slave devices S1, S2, S3 and S4 can send a request to the master device M requesting a BT 2.0 link setup with another slave device. For illustrative purposes, in the initialization phase the slave device S2 is the initiating unit which wishes to set up a BT 2.0 connection link with the slave device S4, for example. Alternatively, the master device M may initiate the high-speed, or BT 2.0, connection link between slave devices. As shown in FIG. 1a, the slave device S2 sends a request 200 to the master device M requesting a BT 2.0 connection link with the slave device S4. For example, the request can be sent in the form of an LMP (Link Manager Protocol) PDU, as shown in FIG. 2. Upon receiving the request, the master device M may respond to the request with three different PDUs, as listed in Table 1.

TABLE 1

Master-Slave LMP PDUs

| PDU | Content |
|---|---|
| LMP_not_accepted | Reason if known |
| LMP_accepted_start | Start Measuring with parameters |
| LMP_accepted_establish | Link establishment parameters (frequency, MCR, QoS) |

Accordingly, the master may send:
   a) an LMP_not_accepted PDU (see FIG. 3), if the master is unable to support this non-frequency-hopping connection link; or
   b) an LMP_accepted_start PDU (see FIG. 4) or an LMP_accepted_establish PDU (see FIG. 5), if the master is able to support this frequency-hopping connection link.

Figure 1B:
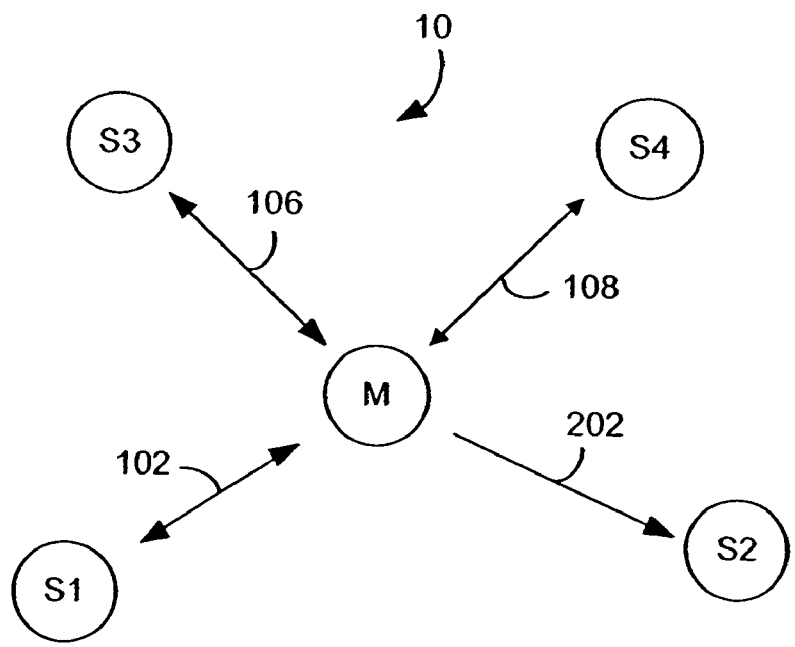
FIG. 1b is a diagrammatic representation illustrating that the master device responds to the requesting slave device, asking the slave device to conduct channel condition measurements.
Figure 1C:
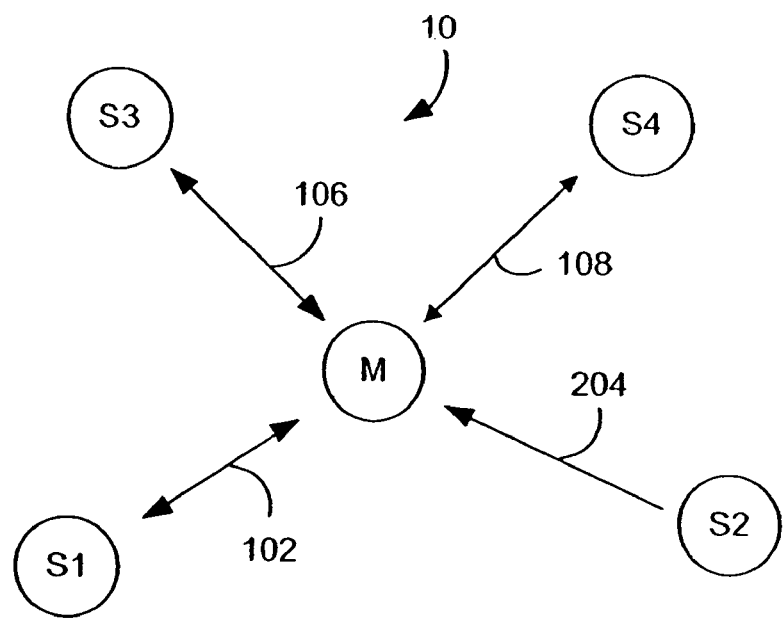
FIG. 1c is a diagrammatic representation illustrating that the slave device sends a measurement report to the master device.
Figure 6:
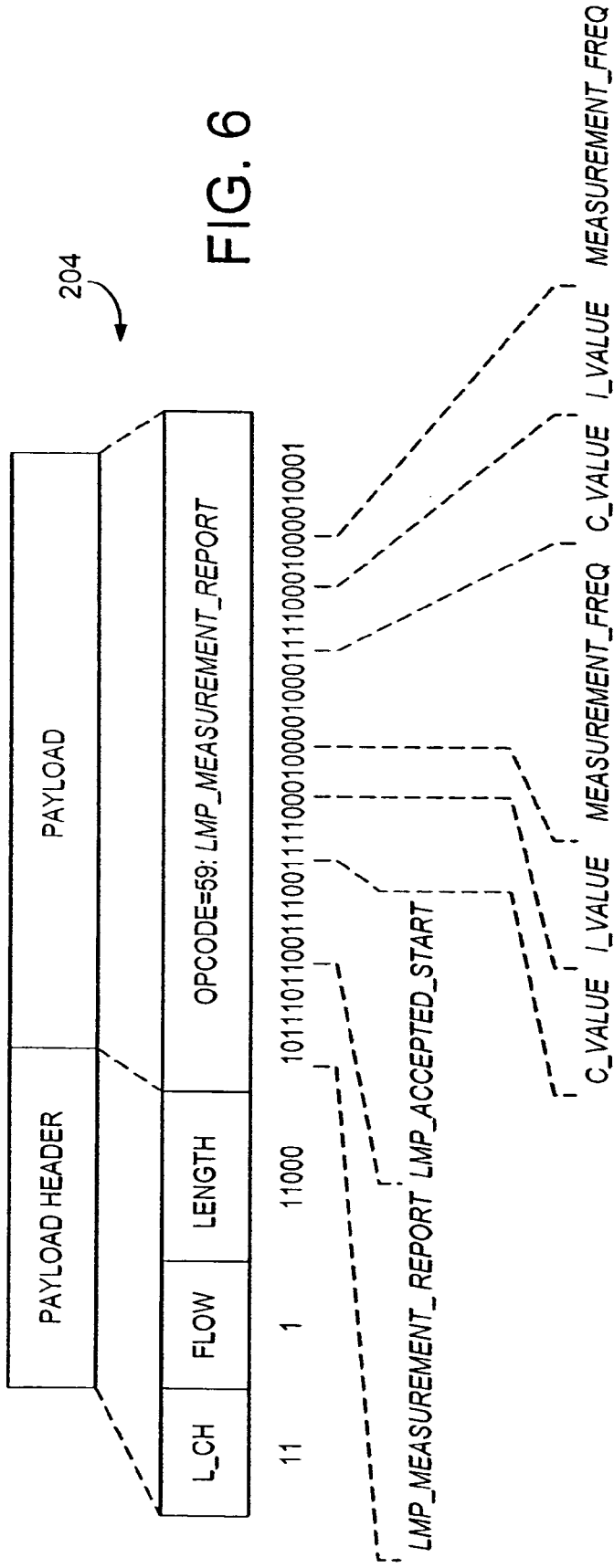
FIG. 6 is a frame structure illustrating an exemplary PDU format used as an LMP_measurement_report response.

If the master device M responds with an LMP_accepted_start PDU 202, as shown in FIG. 1b, the master device provides a plurality of measurement parameters to the requesting slave device S2 for channel condition measurements. The LMP_accepted_start PDU 202 contains, for example, the measurement time and frequencies to be measured. For the purpose of a direct BT 2.0 slave-to-slave connection link, the interference and noise levels I+N (denoted as "I" hereafter) measurement is carried out during a master-to-slave time slot, and an appropriate frequency offset between the master-to-slave frequency channel and the frequency to be measured has to be used. However, the carrier power C is measured during a slave-to-master time slot, without frequency offset, during the transmission of the other candidate slave device, S4. The C level is determined by the Received Signal Strength Indication (RSSI) functionality of the receiver, which, in this case, is the master device M. The frequency offset is described below in conjunction with FIGS. 10 through 12b in more detail. After the scanning time as defined by the master device M is over, the slave device S2 conveys a measurement report 204 to the master device M, as shown in FIG. 1c. For example, the slave device S2 returns the measurement results in an LMP_measurement_report PDU, as shown in FIG. 6. Preferably, the master device starts DH1 (DH=Data High Rate, an Asynchronous Connectionless Link data packet type) communication with the other candidate slave device S4 in order for S4 to obtain RSSI measurement from the transmitting slave device S2. The measurement result will be reported by S4 in a PDU similar to the LMP_measurement_report PDU, as shown in FIG. 6.

It should be noted that it is also possible for the master device M to conduct channel measurements. In that case, the procedural steps, as described in FIGS. 1b and 1c, can be omitted.

Based on the I measurement results, the master device M selects a non-frequency-hopping channel for the BT 2.0 connection link. The master device M must know the transmission power of the slave device that is transmitting. If power control is not used for power adjustment, the master device M can inherently obtain Tx from the device class of the transmitting slave device, within the Tx error margin. If power control is used, the master device can send a power down command or a power up command to the transmitting slave device to obtain, respectively, the minimum or maximum Tx power. The minimum and maximum Tx powers can be obtained by referring to the BT 2.0 specification. Preferably, prior to the measurements, the master device M transmits the "increase Tx power" commands to the slave device S2 to make sure that the slave device S2 uses the maximum transmission power.

The C measurement results are used for estimating the feasibility of the direct slave-to-slave communication between S2 and S4. From the average C measurement results and the transmission power Tx of the slave device S2, the master device M can obtain an estimate of the path loss between S2 and S4. Similarly, the master device M transmits packets to the slave device S4 and obtains the transmit power of S4.

Figure 1D:
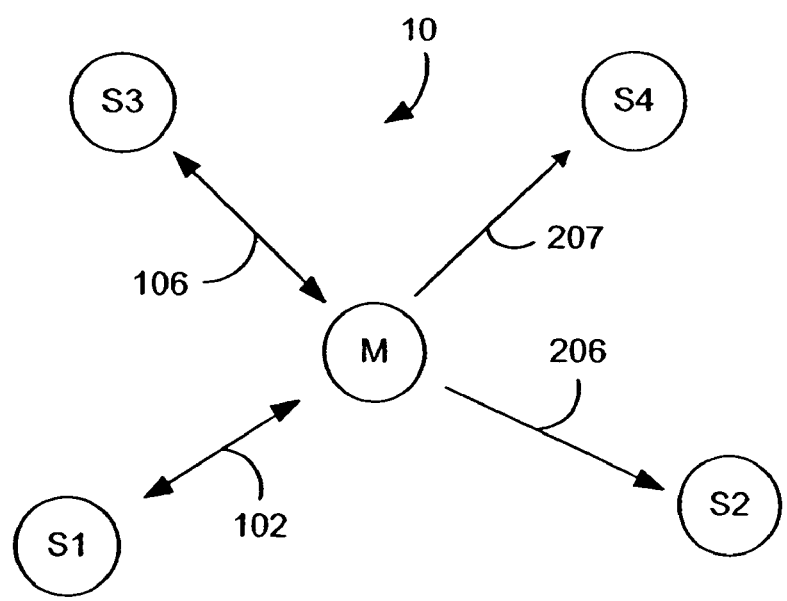
FIG. 1d is a diagrammatic representation illustrating that the master device sends a plurality of channel parameters to the two slave devices involved in the BT 2.0 connection link.
Figure 1E:
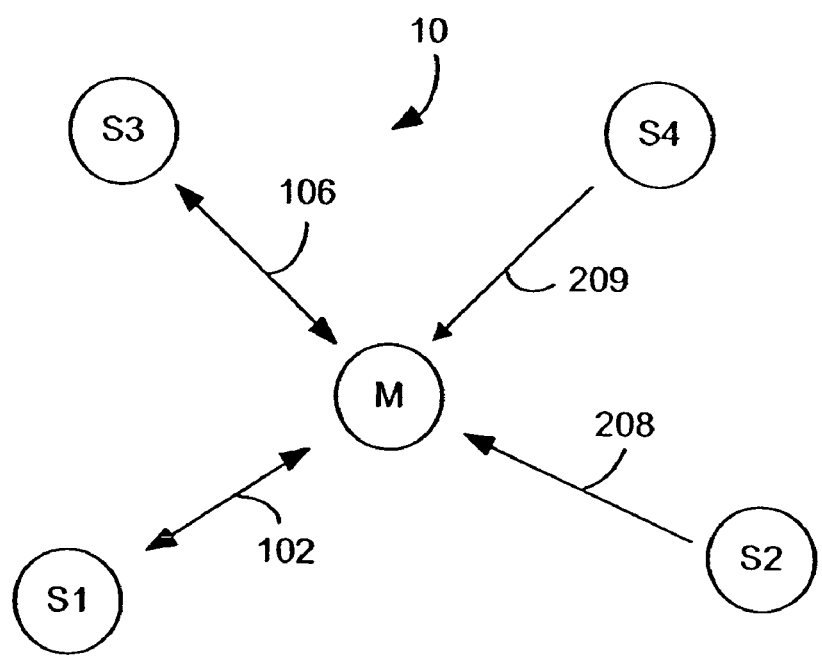
FIG. 1e is a diagrammatic representation illustrating that the involved slave devices acknowledge receipt of the channel parameters.
Figure 1F:
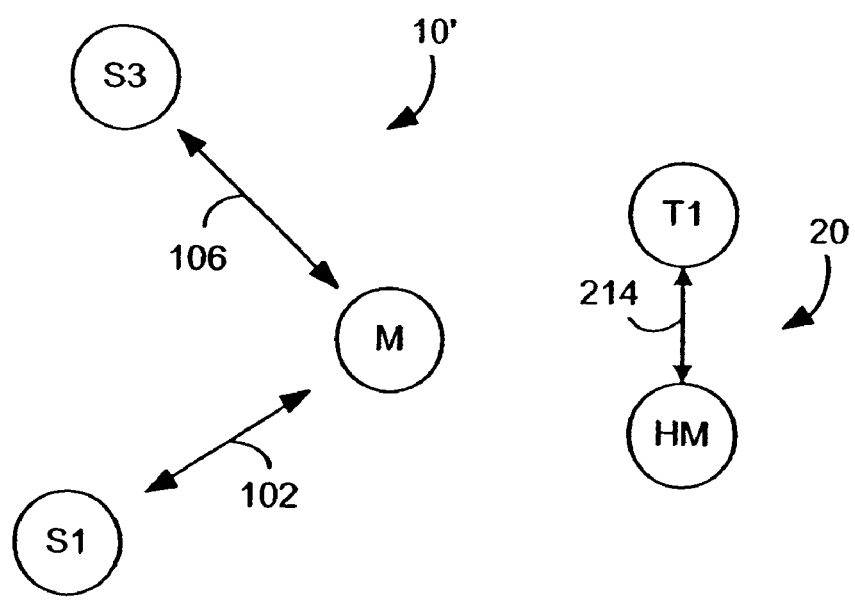
FIG. 1f is a diagrammatic representation illustrating that the master device stops being the master of the involved slave devices and the involved slave devices form a BT 2.0 subnet.

After selecting the non-frequency-hopping channel for the BT 2.0 link, the master device M sends the channel parameters in an LMP_accepted_establish PDU 206 (see FIG. 5) to the slave device S2, as shown in FIG. 1d. The master device M also sends the channel parameters in a similar PDU 207 (not shown) to the slave device S4. Subsequently, the slave device S2 acknowledges receipt of the LMP_accepted_establish PDU 206 with an ACK signal 208, and the slave device S4 acknowledges receipt of the PDU 207 with an ACK signal 209, as shown in FIG. 1e. At this point, the master device M starts a BT 2.0 transmission by sending certain data frames to S2 and S4 at fixed intervals until both the slave devices S2 and S4 acknowledge receipt of the respective frames. Finally, the master device M delegates S2 (or S4) to be a BT 2.0 master of a new subnet 20 by converting the slave devices S2 and S4 into a temporary BT 2.0 master HM and a BT 2.0 terminal T1, respectively, as shown in FIG. 1f. The BT 2.0 communication link is denoted by reference numeral 214. The BT 1.0 communication link between the master device M and the other slave devices S1, S3 remains unchanged. The remaining BT 1.0 piconet is denoted by reference numeral 10'.

Figure 15A:
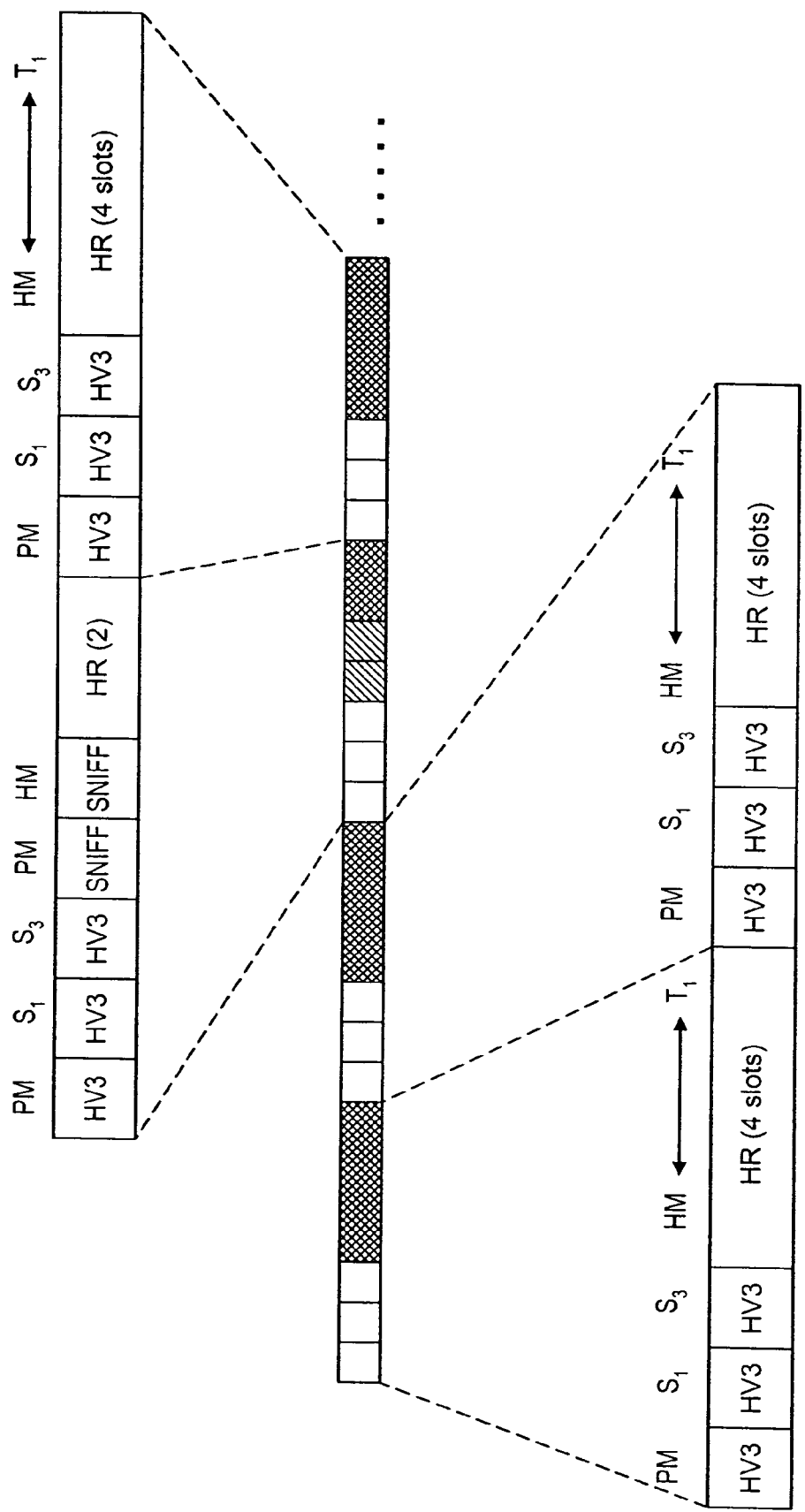
FIG. 15a is a diagrammatic representation illustrating the time slots used for transmission wherein the BT 2.0 subnet uses a sniff mode to maintain synchronization with the remaining BT 1.0 piconet.

The BT 2.0 subnet 20 maintains synchronization with the remaining BT 1.0 piconet 10' by periodically listening to traffic in the BT 1.0 piconet 10' or using a SNIFF mode, as shown in FIG. 15a. As described, the backward compatibility of the slave device S2 and the slave device S4 makes it possible for these devices to operate in either the BT 2.0 mode or BT 1.0 mode.

The backward compatibility of a BT 1.0 piconet allows the same piconet to operate fully or partially in the BT 2.0 communication link. In order for the devices in the same piconet to operate in the BT 2.0 fashion, the master device must be capable of communicating in the BT 2.0 fashion or, at least, it must understand Link Manager Protocol (LMP) messages sent by the requesting slave device (in this case, S2) in the BT 1.0 mode in order to set up the BT 2.0 mode. Any unit in the piconet can request a BT 2.0 connection, but the procedure to set up the BT 2.0 communication link is always coordinated and executed by the master device of the piconet. The new BT 2.0 subnet formed by the involved slave devices can maintain synchronization with the original BT 1.0 piconet. However, the new BT 2.0 subnet can also be spun off from the original BT 1.0 piconet 10 to become an independent piconet 20, without any synchronization to the remaining BT 1.0 piconet 10'.

Figure 1G:
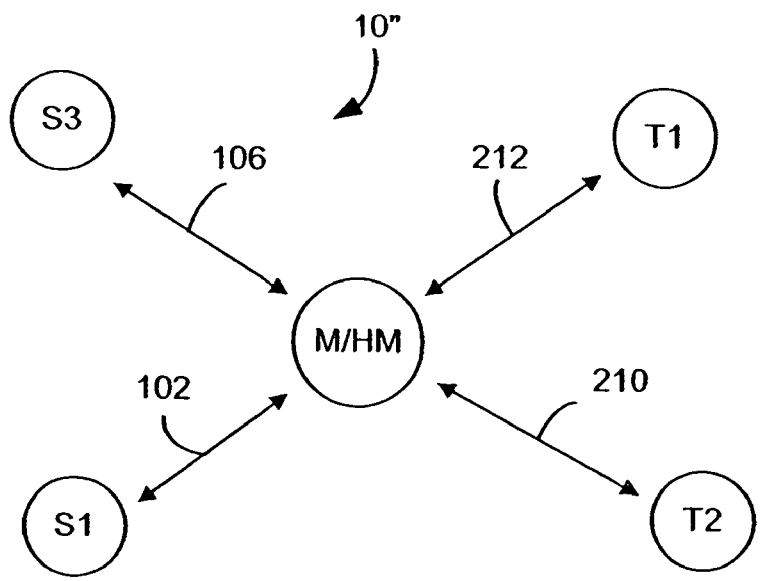
FIG. 1g is a diagrammatic representation illustrating another network configuration, wherein the master device serves as the master of the BT 1.0 connection and the BT 2.0 connection.
Figure 15B:
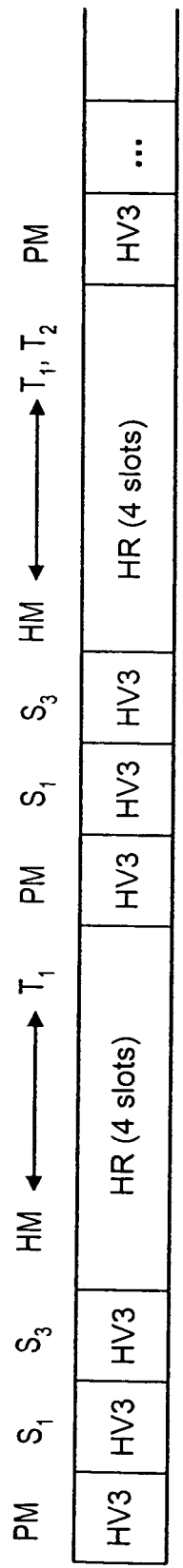
FIG. 15b is a diagrammatic representation illustrating the time slots used for transmission, wherein the master can establish both BT 2.0 and BT 1.0 communication links with the slave devices.

There are basically two possibilities for maintaining synchronization after the involved slave devices operate in the BT 2.0 fashion:

The original master device plays a dual role in the piconet 10", as shown in FIG. 1g. It can maintain a BT 1.0 connection link with some slave devices (S1, S3) and, at the same time, establish a BT 2.0 connection link with other slave devices (T1, T2), as shown in FIG. 1g. The BT 2.0 connection links are denoted by reference numerals 210 and 212. The time slots for transmission, in this situation, are shown in FIG. 15b.

One of the involved slave devices is assigned by the original master device to become a temporary master (HM) of the BT 2.0 subnet, and the master device only provides BT 1.0 connection links with other slave devices (S1, S3) in the remaining piconet, as shown in FIG. 1f.

Figure 1H:
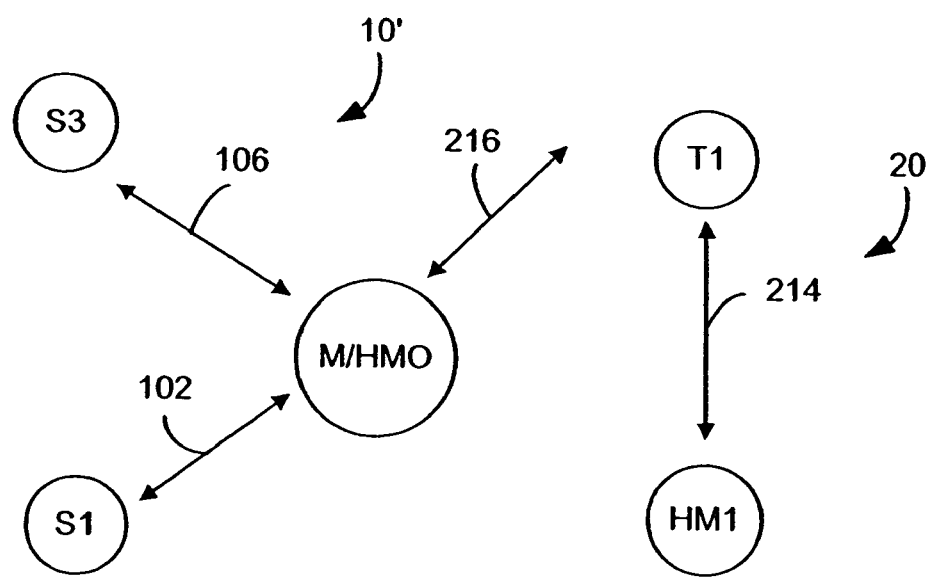
FIG. 1h is a diagrammatic representation illustrating yet anther network configuration in which the remaining piconet and the spun off subnet become independent of each other.
Figure 15C:
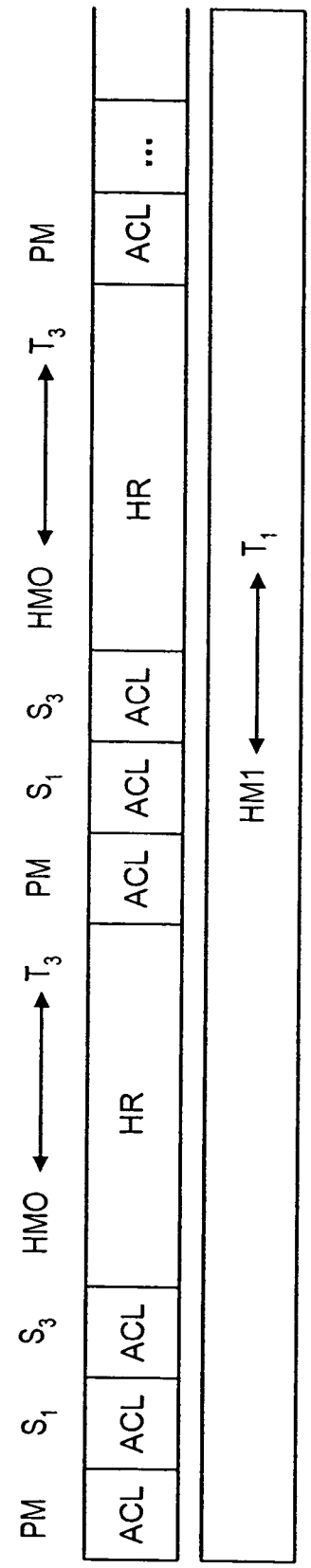
FIG. 15c is a diagrammatic representation illustrating the time slots used for transmission wherein some slave devices are spun off to form an independent BT 2.0 subnet and the original master can establish both BT 2.0 and BT 1.0 communication links with the other slave devices.

Alternatively, one of the involved slave devices is assigned to become a temporary master (HM1) of a separate BT 2.0 subnet, while the original master device can establish both BT 1.0 and BT 2.0 connection link with the remaining slave device (S1, S3, T3), as shown in FIG. 1h. In this case, the BT 2.0 subnet 20 and the piconet 10' are independent, without synchronization therebetween. In FIG. 1h, the master of the spun-off BT 2.0 is denoted by HM1, while the original master device plays the role of a BT 1.0 master (M) and the role of a BT 2.0 master (HM0) in the remaining piconet 10'. The time slots for transmission, in this situation, are shown in FIG. 15c.

It is likely that the channel conditions regarding carrier power C and/or interference and noise conditions (I) change during the data transfer between terminals HM and T1 (FIG. 1f). Thus, the selected frequency used for the current non-hopping channel may no longer be the best frequency for data transmission in the BT 2.0 connection link. To monitor the change in channel conditions, terminals HM and T1 can be adapted to monitor propagation characteristics and data flow quality in the used frequency channel. For example, the monitoring may include continuous averaging of RSSI, transmission power, average packet error rate, average bit error rate, used modulation/coding and data packet memory monitoring. These values are compared to radio quality of service (QoS) parameters, which are used as thresholds. If a threshold is not met, another frequency is selected for the new non-hopping channel. In general, among the BT 2.0 terminals (HM and T1 in this illustrative example) some are empowered to make a decision regarding the frequency to be used in the new BT 2.0 connection link while some are not. Thus, the non-decision-making terminals must report the threshold failure to the empowered terminals. In particular, a specific PDU, LMP_radioQoS_failure, can be used to report the threshold failure. This PDU may indicate which radio QoS criterion or criteria are not met and the current RSSI value, packet error rate, etc. The PDU can be used to report:

a) whether the mean RSSI is above or below a certain threshold;
b) whether the packet error rate exceeds a certain threshold;
c) whether the transmission power exceeds a certain threshold; and
d) whether the used modulation/code belongs to a feasible set of modulation/coding schemes.

When it is required to use another frequency for maintaining the BT 2.0 connection link, the terminal empowered to make the decision regarding the frequency to be used in BT 2.0 connection links has three options:

1) it may decide to stay on the selected frequency that is currently used for the BT 2.0 connection link, and use link adaptation and/or power control to improve the data flow quality. If transmissions are not continuous but repeated periodically, re-timing may be considered;
2) it may start a new measurement process in order to select a new frequency for the new non-hopping channel; or 3) it may allocate a new frequency for the new non-hopping channel based on the previous channel measurement results. For example, it could pick the second best frequency in terms of low interference and noise level in the previous channel measurement results (take FIG. 14, for example, where $f_2$ is the best frequency and $f_1$ is the second best frequency).

Selection of the proper action in terms of the above alternatives may include two phases. In the first phase, it is determined whether degradation in the radio QoS is caused by insufficient RSSI or due to interference. This can be carried out by comparing RSSI values, packet error rates and used modulation/coding methods. If the cause is interference (i.e., RSSI is sufficient for the used modulation/coding but packet error is high), then a new channel measurement process or a new frequency allocation based on the previous measurement can be carried out. If the cause is insufficient RSSI, then Option 1, as described above, should be selected. The second phase is necessary only if the interference is the cause for the radio QoS degradation. In the second phase, Option 2 should be selected if the involved devices are non-delay sensitive, while Option 3 should be selected if the involved devices are delay sensitive.

FIGS. 2 to 6 are examples of LMP PDU formats. FIG. 2 represents a bit level description of LMP_BT2.0_req PDU prior to cyclic redundancy check (CRC) and encoding. As shown in FIG. 2, Opcode 56 in the payload area is used to indicate that the requested connection link is in accordance with the BT 2.0 fashion.

As shown in FIG. 3, the LMP_not_accepted PDU contains the Opcode 56 in the payload area to indicate that the response is related to the requested BT 2.0 connection link. The payload area may contain a reason why the master is unable to support the BT 2.0 link (Unsupport_LMP_feature).

As shown in FIG. 4, the LMP_accepted_start PDU contains the Opcode 56 in the payload area to indicate that the response is related to the requested BT 2.0 connection link. The payload area also contains measurement parameters for channel measurements. As shown in FIG. 4, the measurement parameters include the scanning time for the slave device to measure the channel conditions at each channel (Measurement_time).

As shown in FIG. 5, the LMP_accepted_establish PDU may include link establishment parameters such as the frequency (Used_frequency) to be used for the BT 2.0 connection link, Modular Code Rate (MCR) and QoS parameters. The QoS parameter set also includes radio QoS parameter thresholds. The QoS parameters may include min_mean_RSSI, max_mean_RSSI, max_packet_error_rate, max_Tx_power, min_Tx_power, and set_of_feasible_modulation/coding rates.

As shown in FIG. 6, the LMP_measurement_report PDU may include the measured carrier power C value (C_Value) and the interference and noise I levels (I_Value) in a plurality of measured channels (Measurement_freq).

Figure 7A:
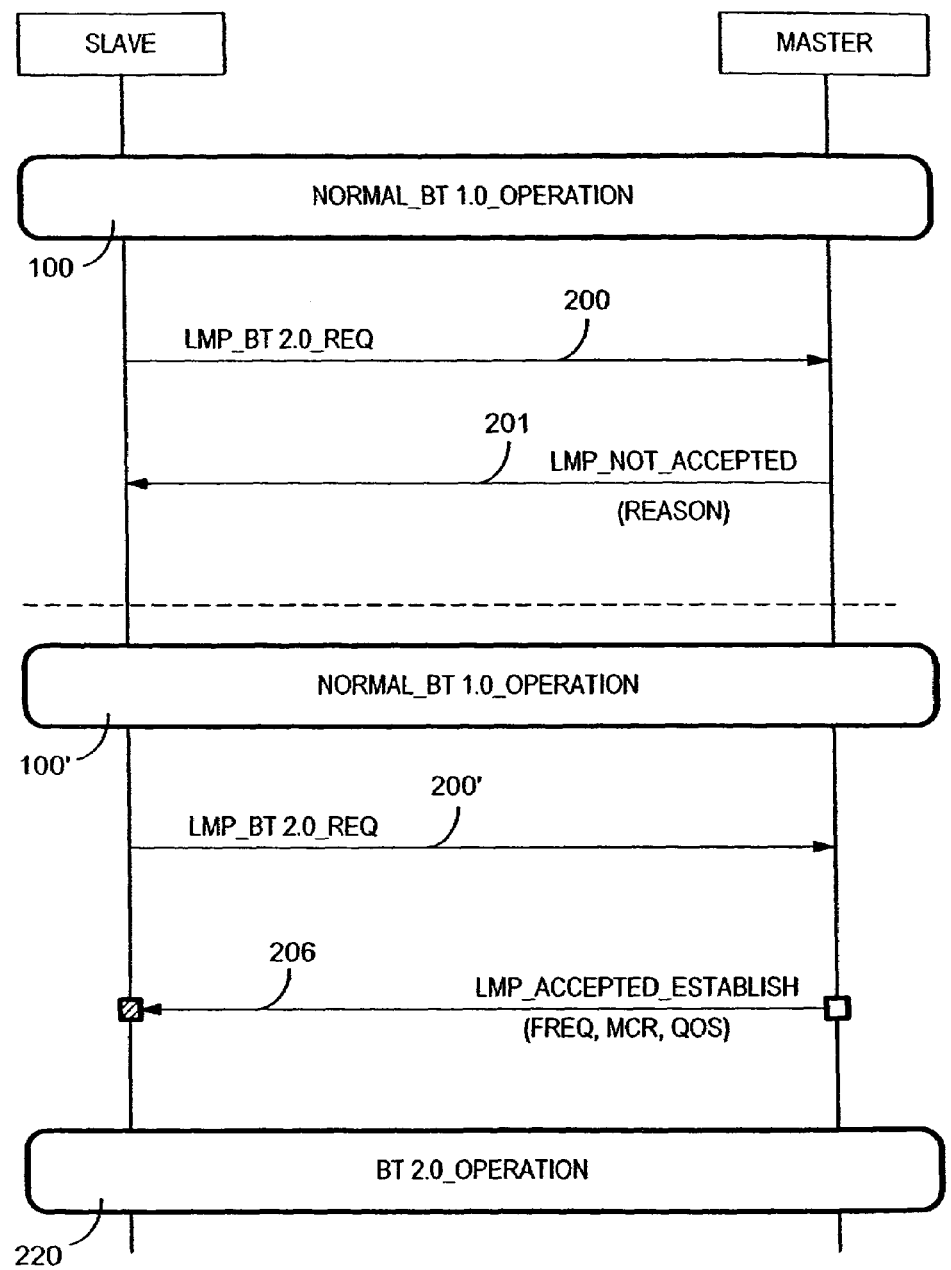
FIG. 7a illustrates a possible signaling sequence in establishing a BT 2.0 connection link.
Figure 7B:
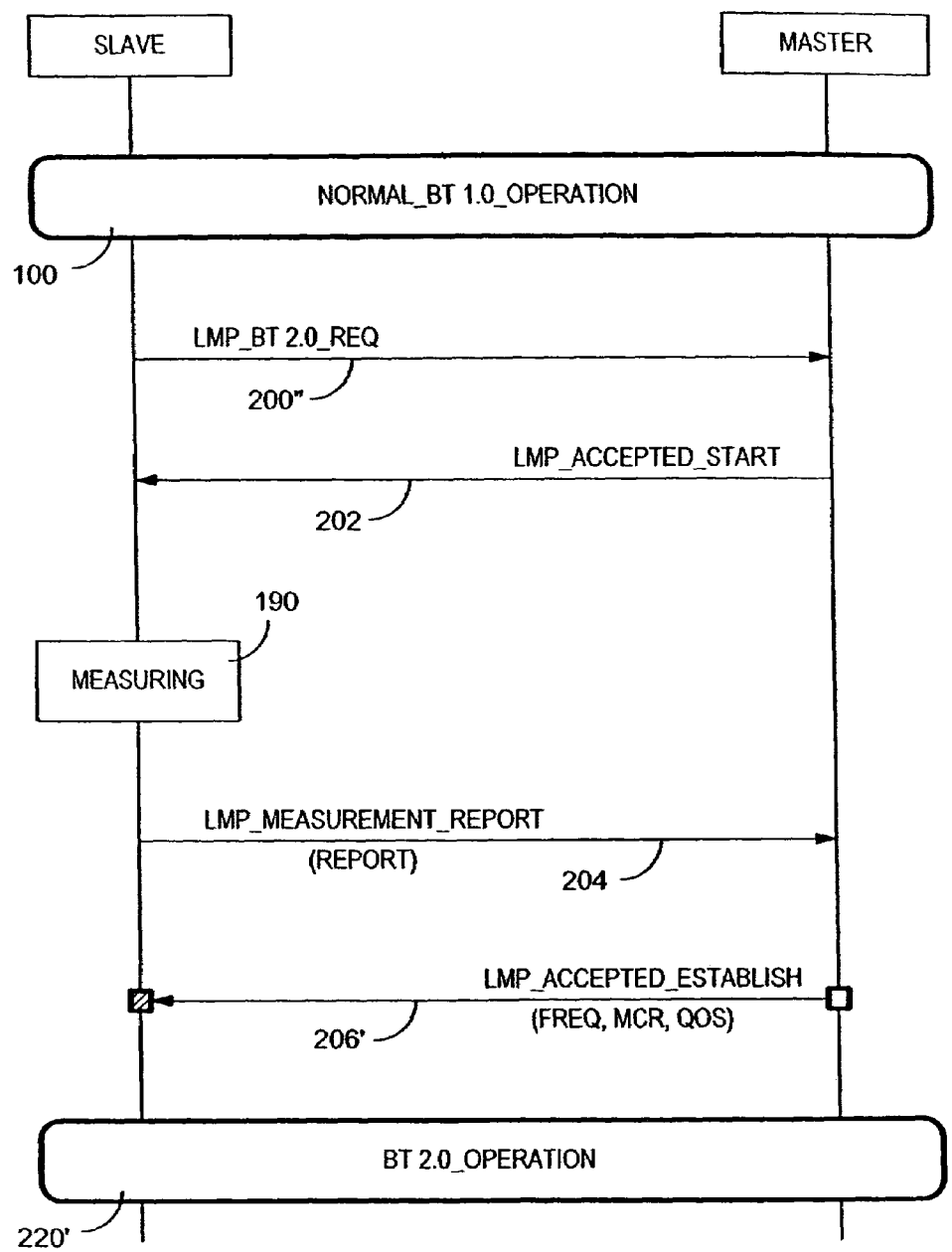
FIG. 7b illustrates another possible signal sequence in establishing a BT 2.0 connection link.

In the course of establishing a BT 2.0 connection link at the request of the slave device, the possible signaling sequences between a requesting slave device and the master device are shown in FIGS. 7a and 7b. In FIG. 7a, originally the two involved slave devices (S2, S4 in FIGS. 1a–1e) are linked to the master device according to the BT 1.0 fashion, as denoted by numeral 100. In the initialization phase, the requesting slave sends an LMP_BT2.0 req PDU 200 to the master device, requesting the establishment of a BT 2.0 link. If the master is unable to support the BT 2.0 link for any reason, it responds to the request by sending an LMP_not_accepted PDU 201 to the requesting slave, stating the reason for not supporting the BT 2.0 link. For example, the reason for not supporting the BT 2.0 link may include that the data flow quality is currently below the radio QoS requirements. It is possible that the master device finds that the other involved slave device (S4) is not in compliance with BT 2.0 requirements. Accordingly, the BT 1.0 link between the two involved slave devices and the master device is maintained, as denoted by numeral 100'. It is possible that when the master device does not know anything about the BT 2.0 connection link and fails to respond to the request 200, the requesting slave device should not wait indefinitely for a response from the master device but maintain the BT 1.0 connection link after a set waiting period (see FIG. 8a, step 317). At a later time, the requesting slave device sends another LMP_BT2.0 req PDU 200' to the master device, again requesting the establishment of a BT 2.0 link. If the master is able to support the BT 2.0 link and it has selected a frequency for the BT 2.0 link, it responds to the request by sending an LMP_accepted_establish PDU 206 to the requesting slave device, including the selected frequency, MCR and the required QoS parameters. It is understood that the master device also sned a similar PDU to the other involved slave device. Subsequently, a BT 2.0 link is established between the requesting slave and the other slave device, as indicated by numeral 220. However, the master must give up its master role with regard to the two involved slave devices, as shown in FIG. 1f.

Another possible signal sequence is shown in FIG. 7b. As shown in FIG. 7b, upon receiving a request 200" from the requesting slave device requesting the establishment of a BT 2.0 link, the master device sends the requesting slave device an LMP_accepted_start PDU 202 including the frequencies to be measured in order to establish a non-frequency-hopping link. The slave device measures the carrier power C and/or the interference and noise conditions I as indicated by numeral 190 and reports to the master the measurement results in an LMP_measurement_report PDU 204. Based on the measurement results, the master selects a frequency for the BT 2.0 link. The master sends an LMP_accepted_establish PDU 206' to the requesting slave device, including the selected frequency, MCR and the required QoS parameters. Subsequently, a BT 2.0 link is established between the two involved slave devices as indicated by numeral 220'. Because LMP PDUs are sent over an asynchronous connection-less (ACL) link, all packets are acknowledged in the Link Control level. Hence, a separate acknowledge signal ACK in the Link Management level is not required.

Figure 8A:
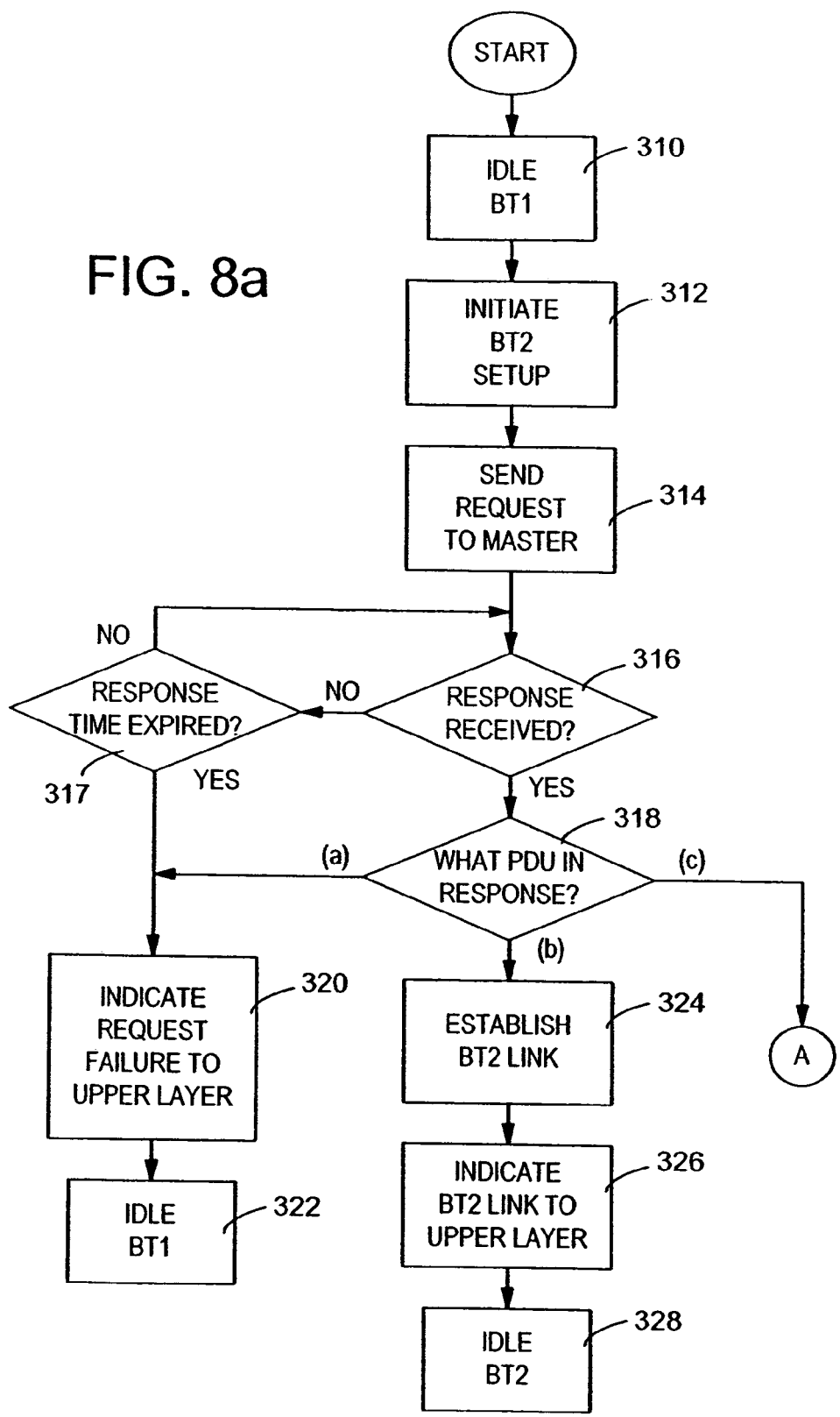
FIGS. 8a and 8b are flow charts illustrating an exemplary state diagram of a slave device requesting a BT 2.0 connection link with another slave device.
Figure 8B:
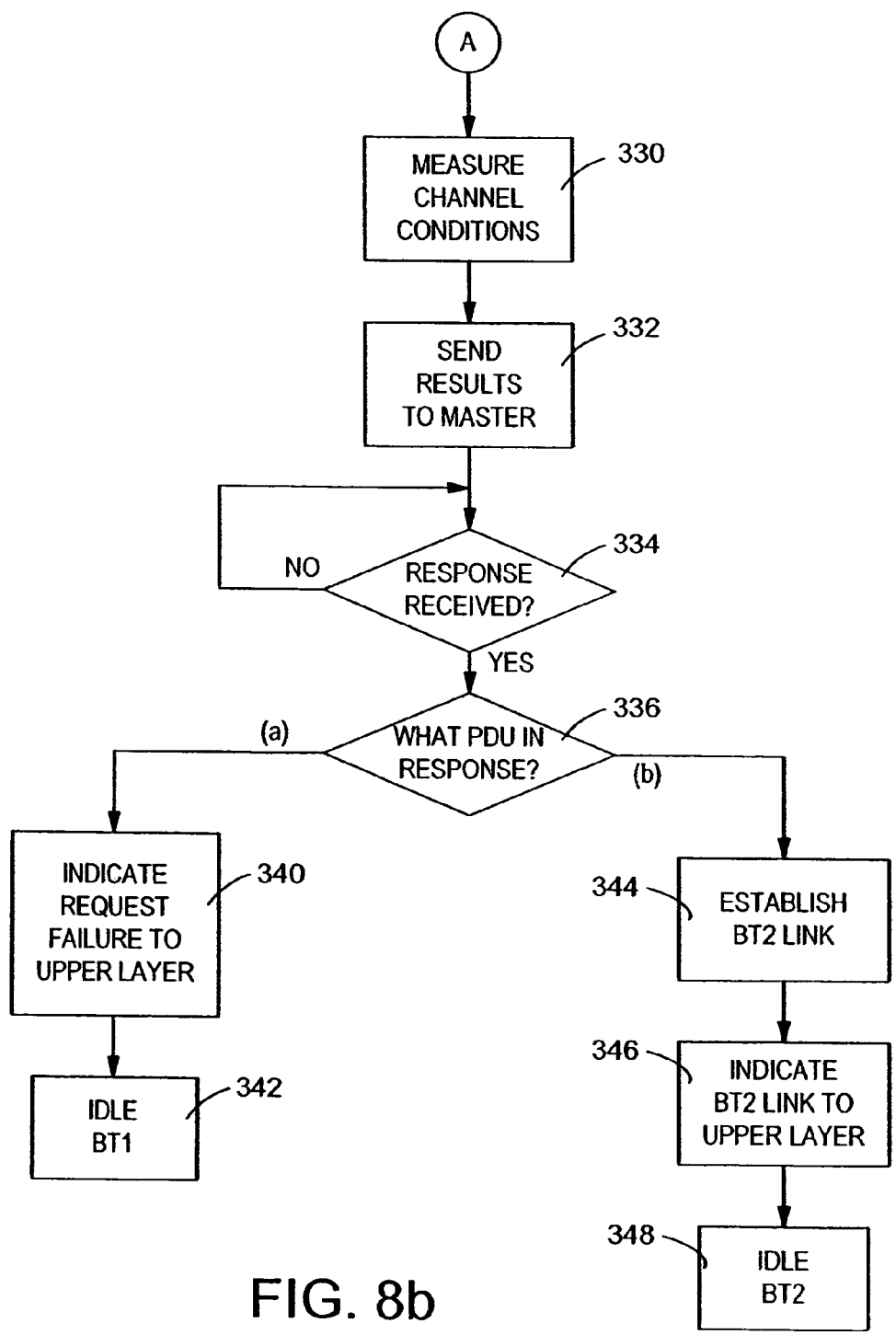

FIGS. 8a and 8b are flow charts illustrating a sequence of steps executed by a requesting slave device. As shown in FIG. 8a, initially both the slave devices are connected with a master device in a BT 1.0 fashion, as indicated by numeral 310. As the requesting slave device wishes to establish a BT 2.0 link with the other involved slave device, it starts out by initializing a BT 2.0 link setup message from its upper layer at step 312 and sends an LMP_BT2.0_req PDU to the master device at step 314. It waits for a response from the master at step 316. It is possible that the master device fails to respond to the request for a certain reason, and the requesting slave device will not receive a response from the master. Preferably, the requesting slave device sets a time limit for receiving such a response. As shown at step 317, if the requesting slave device does not receive the response from the master device after the set time has expired, it indicates the request failure to the upper level at step 320. If the set time has not expired, the slave device keeps waiting until it receives a response at step 318. There are three possibilities regarding the response from the master device: a) the response is an LMP_not_accepted PDU; b) the response is an LMP_accepted_establish PDU; or c) the response is an LMP_accepted_start PDU. If possibility (a) occurs, the slave device indicates the request failure to the upper level at step 320. The BT 1.0 link between the two slave devices and the master is maintained or re-established, as indicated by numeral 322. If possibility (b) occurs, the requesting slave device establishes the BT 2.0 connection link with the other involved slave device according to the frequency selected by the master device at step 324 and indicates the BT 2.0 connection link to the upper layer at step 326. The BT 2.0 link between the two involved slave devices is maintained as long as it is required, as indicated by numeral 328. If possibility (c) occurs, the slave device carries out the channel measurement procedure, as shown in FIG. 8b.

As shown in FIG. 8b, the slave device measures channel conditions at step 330 and sends measurement results to the master channel at step 332. The slave device must wait for a response from the master device at step 334 in order to take the next course of action. There are two possibilities regarding the response from the master device: a) the response is an LMP_not_accepted PDU; or b) the response is an LMP_accepted_establish PDU. If possibility (a) occurs, the slave device indicates the request failure to the upper level at step 340. The BT 1.0 link between the slave devices and the master is maintained or re-established, as indicated by numeral 342. If possibility (b) occurs, the requesting slave device establishes the BT 2.0 connection link with the other involved slave device according to the frequency selected by the master device at step 344 and indicates the BT 2.0 connection link to the upper layer at step 346. The BT 2.0 link between the two involved slave devices is maintained as long as it is feasible, as indicated by numeral 348.

Figure 9A:
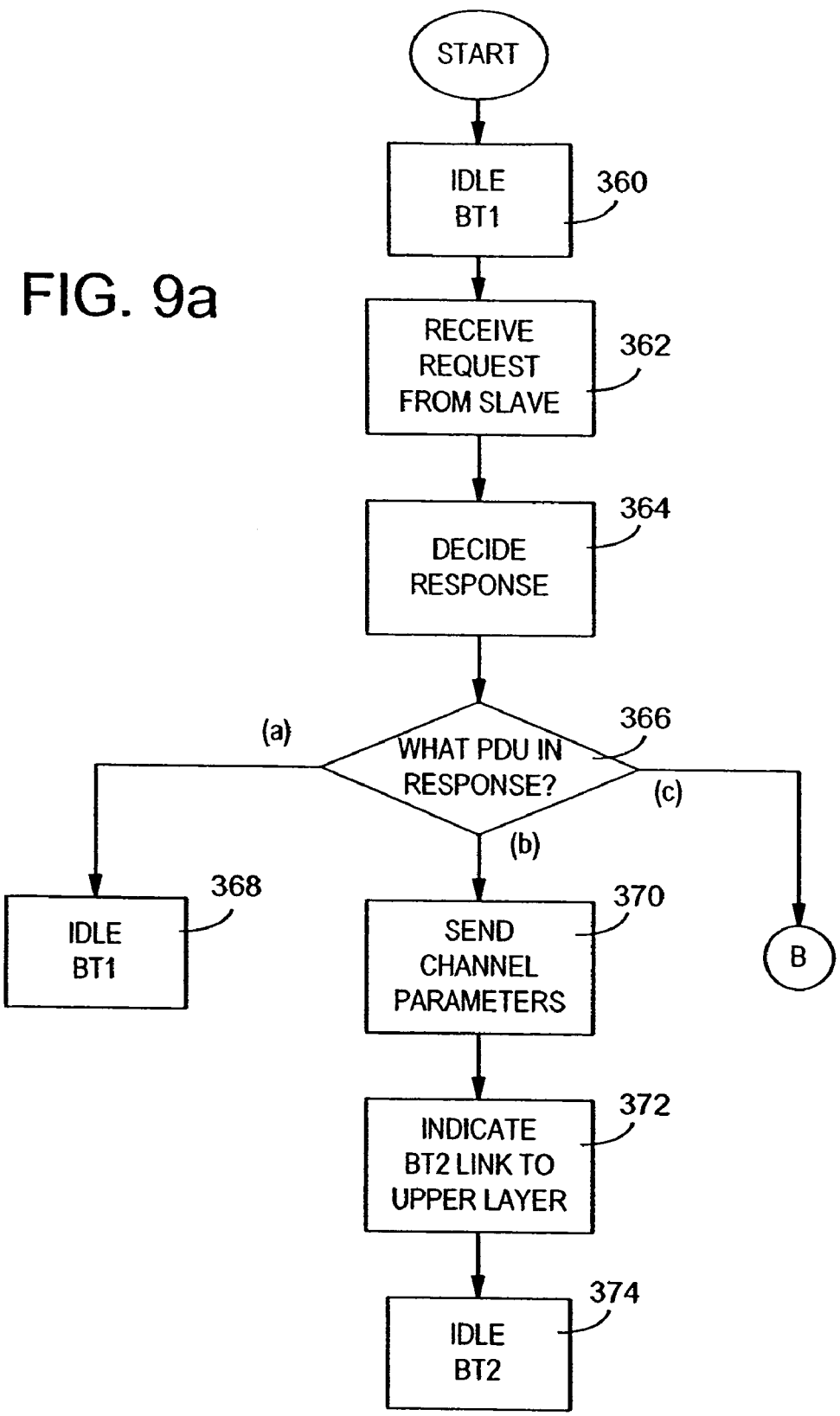
FIGS. 9a and 9b are flow charts illustrating an exemplary state diagram of a master device responding to a request for establishing a BT 2.0 connection link between two slave devices.
Figure 9B:
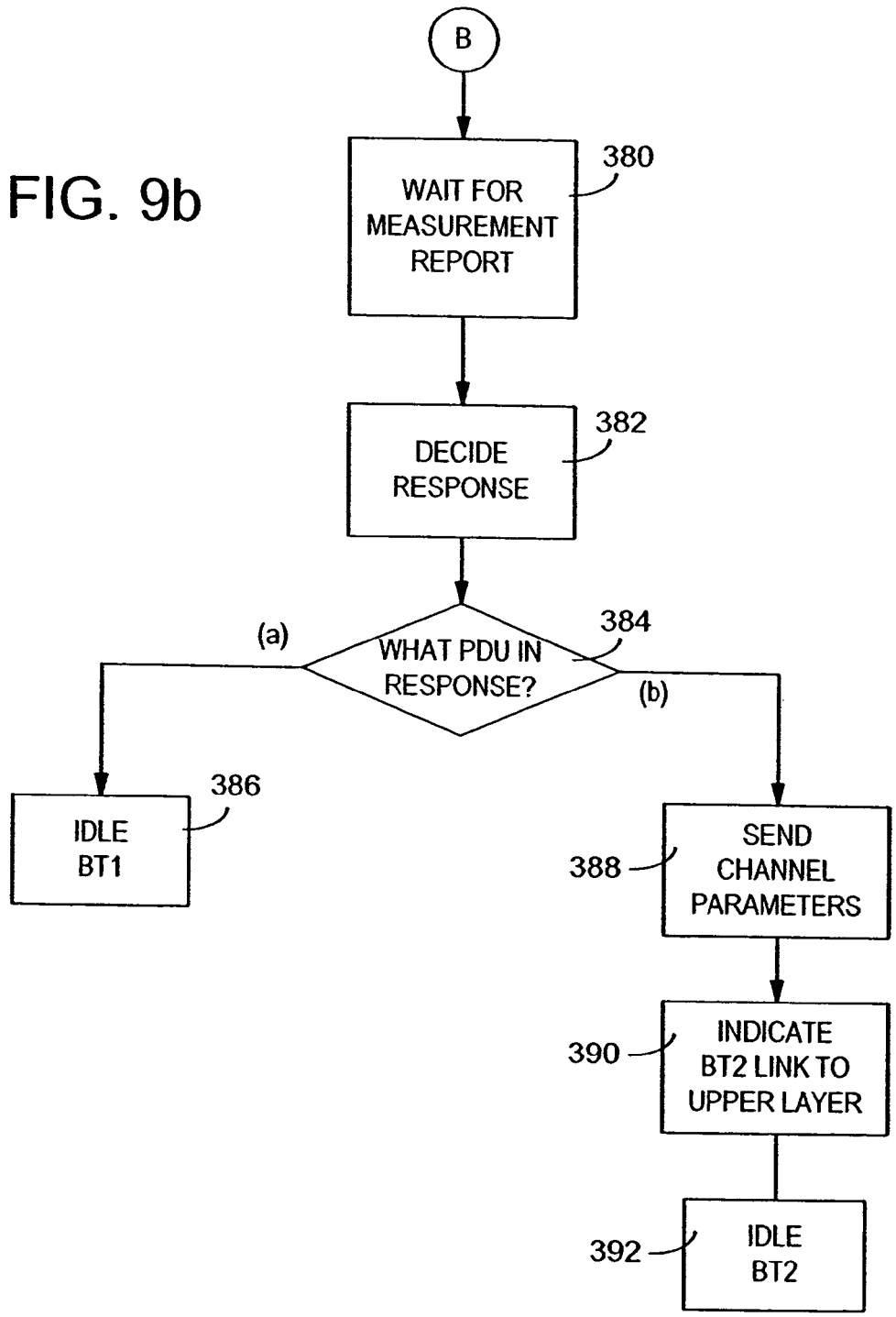

FIGS. 9a and 9b are flow charts illustrating a sequence of steps executed by a master device. As shown in FIG. 9a, initially the master device is connected with the involved slave devices in a BT 1.0 fashion, as indicated by numeral 360. Upon receiving an LMP_BT2.0_req PDU from a slave channel requesting to establish a BT 2.0 connection link at step 362, the master device determines whether it can support the BT 2.0 connection link and how to respond to the requesting slave device at step 364. There are three possibilities regarding the response to be sent to the requesting slave device at step 366: a) the response is an LMP_not_accepted PDU indicating that the master device is unable to support a BT 2.0 connection link, at least for the time being; b) the response is an LMP_accepted_establish PDU; and c) the response is an LMP_accepted_start PDU. If possibility (a) occurs, the BT 1.0 link between the slave and the master is maintained or re-established, as indicated by numeral 368. If possibility (b) occurs, the master device provides link establishment parameters to the requesting slave device and the other involved slave device at step 370 and indicates the BT 2.0 connection link to the upper layer at step 372. The BT 2.0 link between the two involved slave devices is maintained as long as it is feasible, as indicated by numeral 374. If possibility (c) occurs, the master device provides the requesting slave device with measurement parameters for carrying out the channel measurement procedure, and the process continues in FIG. 9b.

As shown in FIG. 9b, after sending out the LMP_accepted_start PDU to the requesting slave channel, the master device waits for the measurement results, as contained in an LMP_measurement_report PDU from the requesting slave device, at step 380. Based on the measurement results, the master must decide the next course of action at step 382. There are two possibilities regarding the decision made by the master device at step 384: a) the master sends an LMP_not_accepted PDU to the slave device to indicate that it is unable to support the requested BT 2.0 connection link, based on the channel conditions measured by the requesting slave device; or b) the master sends an LMP_accepted_establish PDU to provide link establishment parameters to the requesting slave device, and a similar PDU to the other involved slave device. If possibility (a) occurs, the BT 1.0 link between the slave devices and the master is maintained or re-established, as indicated by numeral 386. If possibility (b) occurs, the BT 2.0 connection link between the two involved slave devices is established at step 388 and the upper level is notified of the BT 2.0 connection link at step 390. The BT 2.0 link between two involved slave devices is maintained as long as it is feasible, as indicated by numeral 392.

It should be noted that FIGS. 8a through 9b illustrate the flow charts involving a slave device and a master device when the establishment of the BT 2.0 connection link between two slave devices is requested by one of the slave devices. In a similar manner, the master device can initiate a BT 2.0 connection link between any two slave devices in the piconet.

Figure 10:
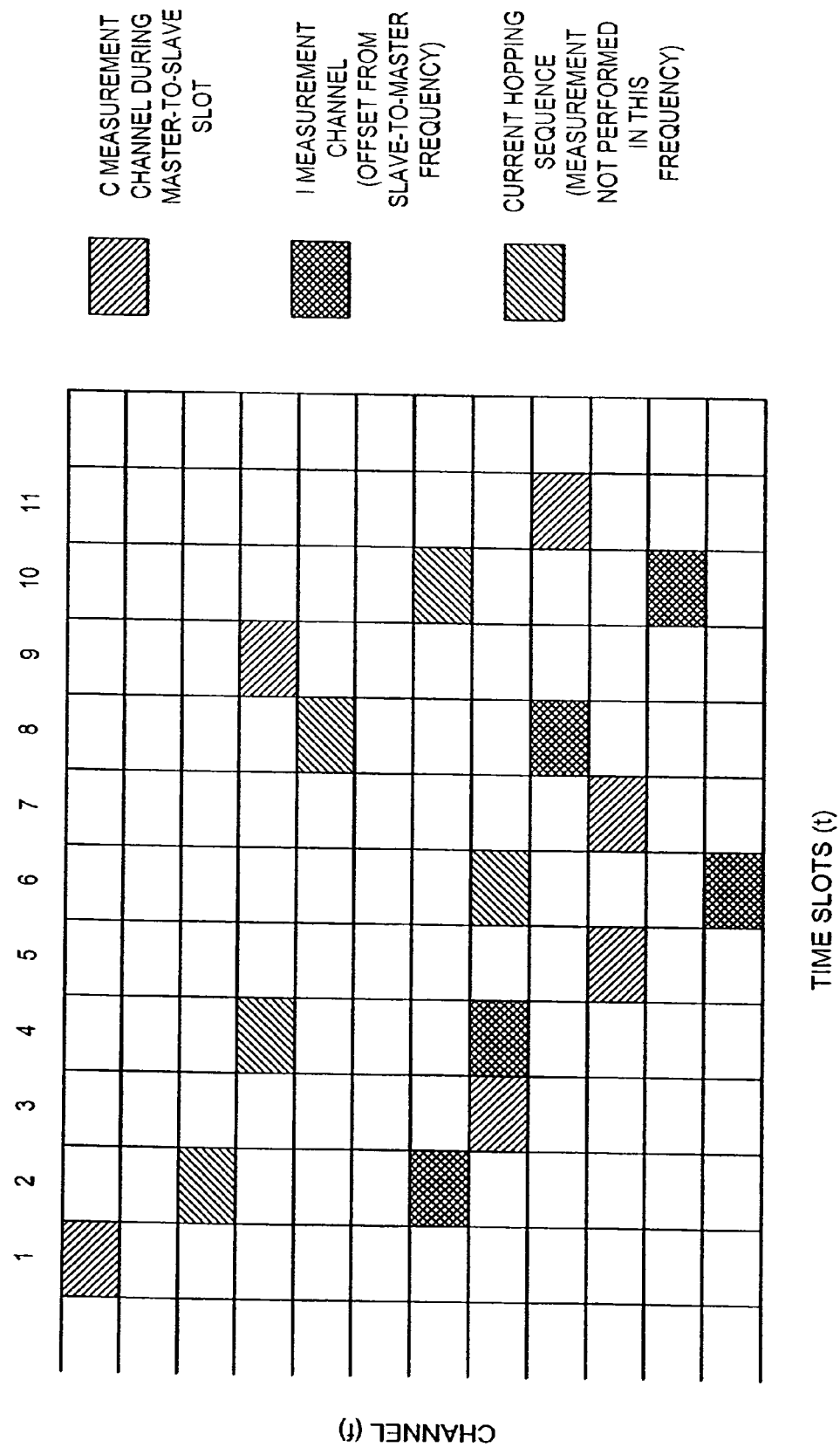
FIG. 10 is a diagrammatic representation illustrating the selection of channel measurement frequencies.

As described in conjunction with FIG. 1b, when the requesting slave device S2 carries out the I measurement, it avoids measuring the master-to-slave transmission itself and/or its spectral leakage. Accordingly, an appropriate frequency offset between the master-to-slave frequency channel and the frequency to be measured is used. Preferably, the frequency offset value is high enough so that the transmitted power leakage over the adjacent channels does not significantly affect the measurement results. The exemplary channel measurement frequencies are shown in FIG. 10. It should be noted that the illustration and the description taken in conjunction with FIG. 10 through FIG. 12b are for the BT 2.0 connection between the master device and a slave device, where the I measurement is carried out during a slave-to-master time slot and the C measurement is carried out during a master-to-slave time slot, in contrast to the direct slave-to-slave connection of the present invention, wherein the I measurement is carried out during a master-to-slave slot and the C measurement is carried out during a slave-to-master time slot. However, the method of shifting channel frequences and designating a hopping sequence for multi-slot packet transmission, as illustrated in FIGS. 10–12b, can be applied to the direct slave-to-slave BT 2.0 connection, according to the present invention.

As shown in FIG. 10, the odd-numbered time slots are master-to-slave slots in which the carrier power C measurements are made, and the even-numbered time slots are slave-to-master slots in which the interference and noise I levels are measured. It should be noted that the channel that is used for I measurement in each slave-to-master slot is offset by 4 channels from the slave-to-master frequency in the current hopping sequence. FIG. 10 illustrates a possible way to select the I measurement frequency during a slave-to-master slot for packet transmission over one-slot frames.

Figures 11A, 11B:
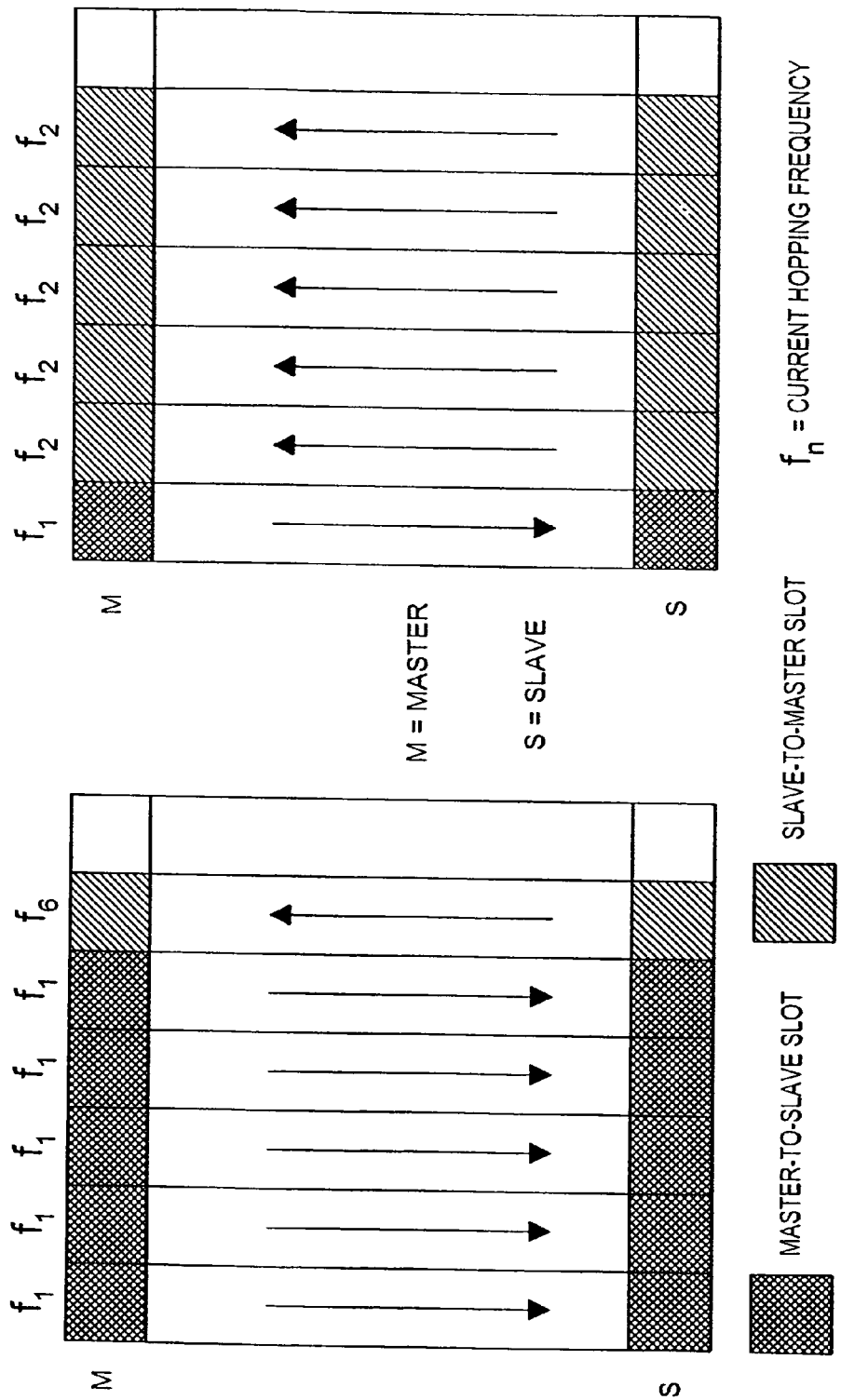
FIGS. 11a and 11b are diagrammatic representations illustrating a hopping sequence example for packets that occupy 5 time slots.

In multi-slot packet transmission, a special offset calculation is used to prevent measuring slave-to-master slots as an I measurement channel. FIGS. 11a and 11b illustrate a hopping sequence for packets that occupy 5 time slots. In FIG. 11a, the frequency of the master-to-slave slots is $f_1$, while the frequency of the slave-to-master slot is $f_6$. It is possible, for example, to use $f_b = f_6 \pm 4$ as the measurement frequency, which is different from both $f_6$ and $f_1$. Likewise, in FIG. 11b, the frequency of the master-to-slave slot is $f_1$ while the frequency of the slave-to-master slots is $f_2$. It is possible, for example, to use $f_b=f_2\pm 4$ as the measurement frequency, which is different from both $f_2$ and $f_1$.

Figures 12A, 12B:
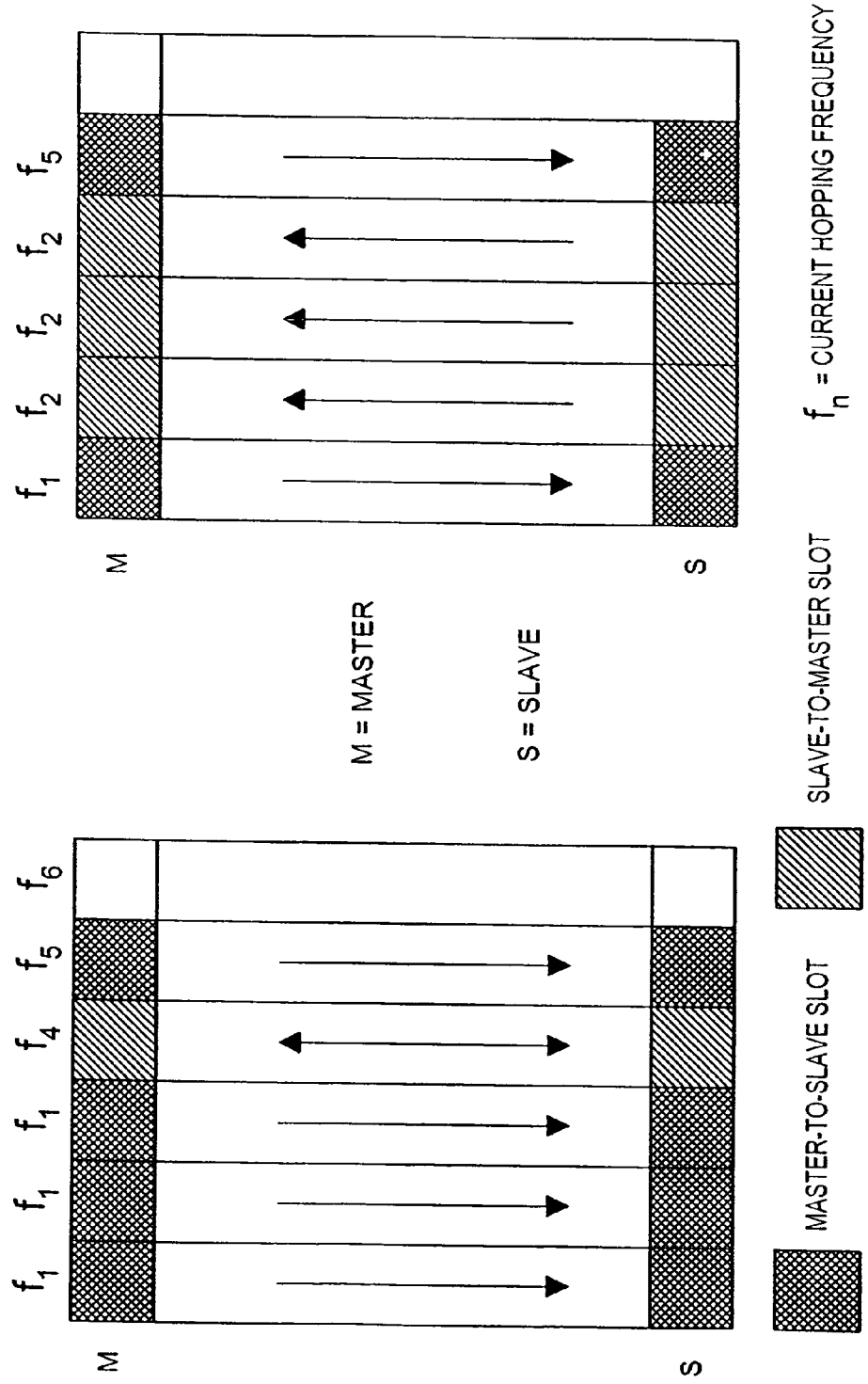
FIGS. 12a and 12b are diagrammatic representations illustrating a hopping sequence example for packets that occupy 3 time slots.

FIGS. 12a and 12b illustrate a hopping sequence for packets that occupy 3 time slots. In FIG. 12a, the frequency of the first master-to-slave slots is $f_1$, while the frequency of the subsequent slave-to-master slot is $f_4$. It is possible, for example, to use $f_b=f_4\pm 4$ as the measurement frequency, which is different from both $f_4$ and $f_1$. Likewise, in FIG. 12b, the frequency of the first master-to-slave slot is $f_1$, while the frequency of the subsequent slave-to-master slots is $f_2$. It is possible, for example, to use $f_b=f_2\pm 4$ as the measurement frequency, which is different from both $f_2$ and $f_1$. However, the situation can be more complex. Let $f_a$ be the first possible frequency of a multi-slot packet and $f_c$ be the current hopping frequency, and the frequency of the I measurement channel be $f_b$, which is 10 MHz from the current hopping frequency. The 10 MHz frequency offset is to ensure that the image frequency of the receiver does not coincide with the actual frequency, because the limited rejection at the image frequency may affect the measurement results.

Within the 79 available frequency channels of the ISM band, if $10<|f_b-f_a|<69$, then we can use $f_b=f_c+10$. Otherwise, the possible value for $f_b$ is determined from the following equation:

$$f_b=g(f_c, f_a, f_b)$$

where $$g(f_c, f_a, f_b)=(f_c-10)-79\lfloor(f_c-10)/79\rfloor, \forall i[|f_{bi}-f_{ai}|<10\vee|f_{bi}-f_{ai}|>69]$$

As described earlier, the preferred measurement resolution is 1 MHz. After the channel measurements are completed, there are 79 C values and 79 I values, with one C and one I value for each frequency channel. These values are normally averaged over a certain amount of measured C and I values, because the same channel might be measured a number of times. The averaging of the measurement results can be carried out during the measurement (continuous averaging) or after the measurement. The averaging procedure for the C value is shown below:

$$C_{f79}(ave) = (1/N)\sum_{k=N}^{N-1} C_{f79}(k),$$

where N is the number of measurements and the averaging is carried out over each of the 79 channels. If the averaging is carried out over the whole band, then $$C_f(ave) = (1/79)\sum_{l=0}^{79}\left\{(1/N)\sum_{k=0}^{N-1} C_{fl}(k)\right\},$$

where N is the number of measurements on each of the 79 channels.

The I measurement results are averaged in a similar way. However, averaging over the whole band is not used. Averaging of the carrier power C over the whole band means that the selection of a best channel placement is based on the I measurement only. In this case C measurements are not required. This approach ignores fast fading, which is actually desirable. Notches caused by fast fading are changing their locations quite swiftly if there are even slight changes in the propagation environment, and, therefore, their locations should not be relied upon when the optimum channel placement is considered. Alternatively, it is possible to measure the I conditions, because they probably give satisfactory results in a channel placement.

As a typical procedure, a number of measured C and I values from the same channels are parameterized, as this amount depends on the available measurement time and the connection initialization time requirements. For example, if it is required to make 10 measurements per channel, then the required time for measurement is given by 10×79× 0.001250s=0.98s. The accuracy of the measured C and I values is dependent on the receiver RSSI measurement accuracy. An example of a 64 dB dynamic range of an RSSI measurement is illustrated in FIG. 13.

Depending on the RSSI measurement resolution, the required amount of bits needed to present C and I values can be estimated. For example, if there is a 3 dB resolution, the whole dynamic range of the RSSI measurement can be divided into 22 levels. Thus, a minimum of 5 bits is used so that all the levels can be presented. With the measured I values, it is possible to use only 4 bits of data because the I values above a certain level may not be worthy of being addressed. At those high levels, the interfering source may be too strong and make the C/I ratio too small for channel selection regardless of what the C value would normally be. The possible values for C and I measurement are given in Table 2.

TABLE 2

| | Possible C and I Bit Vectors | |
| --- | --- | --- |
| RSSI Level | Possible bit vector for C (5 bits) | Possible bit Vector for I (4 bits) |
| −20 | 00000 | |
| −23 | 00001 | |
| −26 | 00010 | |
| −29 | 00011 | |
| −32 | 00100 | |
| −35 | 00101 | |
| −38 | 00110 | 0000 |
| −41 | 00111 | 0001 |
| −44 | 01000 | 0010 |
| −47 | 01001 | 0011 |
| −50 | 01010 | 0100 |
| −53 | 01011 | 0101 |
| −56 | 01100 | 0110 |
| −59 | 01101 | 0111 |
| −62 | 01110 | 1000 |
| −65 | 01111 | 1001 |
| −68 | 10000 | 1010 |
| −71 | 10001 | 1011 |
| −74 | 10010 | 1100 |
| −77 | 10011 | 1101 |
| −80 | 10100 | 1110 |
| −83 | 10101 | 1111 |

Accordingly, the needed data packet size would be 9×79=711 bits. This packet size indicates that a DM3/DH3 ACL packet type is required (DM=Data Medium Rate). However, it is possible to organize measurement data such that one-slot packet types can be used in transmission. In practice, this signifies a data packet of 136–216 bits (DM1/ DH1). In this case, the measurement data has to be sorted, for example, so that only the 9–12 lowest I values and the corresponding C values are reported, instead of all the measured C and I values. It should be noted that when the C and I information is assigned only to certain frequency channels, the associated frequency information must also be notified along with the reported C and I values. The 79 frequencies in the ISM need 7 bits of data to notify. An example of data packet format prior to data whitening and coding is illustrated in the LMP_measurement_report PDU, as shown in FIG. 6.

A DH1 packet can contain up to 12 measured units including C, I and frequency values because no coding is utilized. A DM1 packet contains only 9 measured units because ⅔ coding is used. A summary of the reporting format is shown in Table 3. This reporting format can be defined by the master device with the LMP_accepted_start PDU.

TABLE 3

Required Reporting Payload Types

| Reporting format | Needed amount of bits | Needed payload type |
|---|---|---|
| Full measurement | 9 × 79 = 711 | DM3/DH3 |
| 1 only reporting | 4 × 79 = 316 | DM3/DH3 |
| 12 best channels | (9 + 7) × 12 = 192 | DM1/DH1 |

Figure 14:
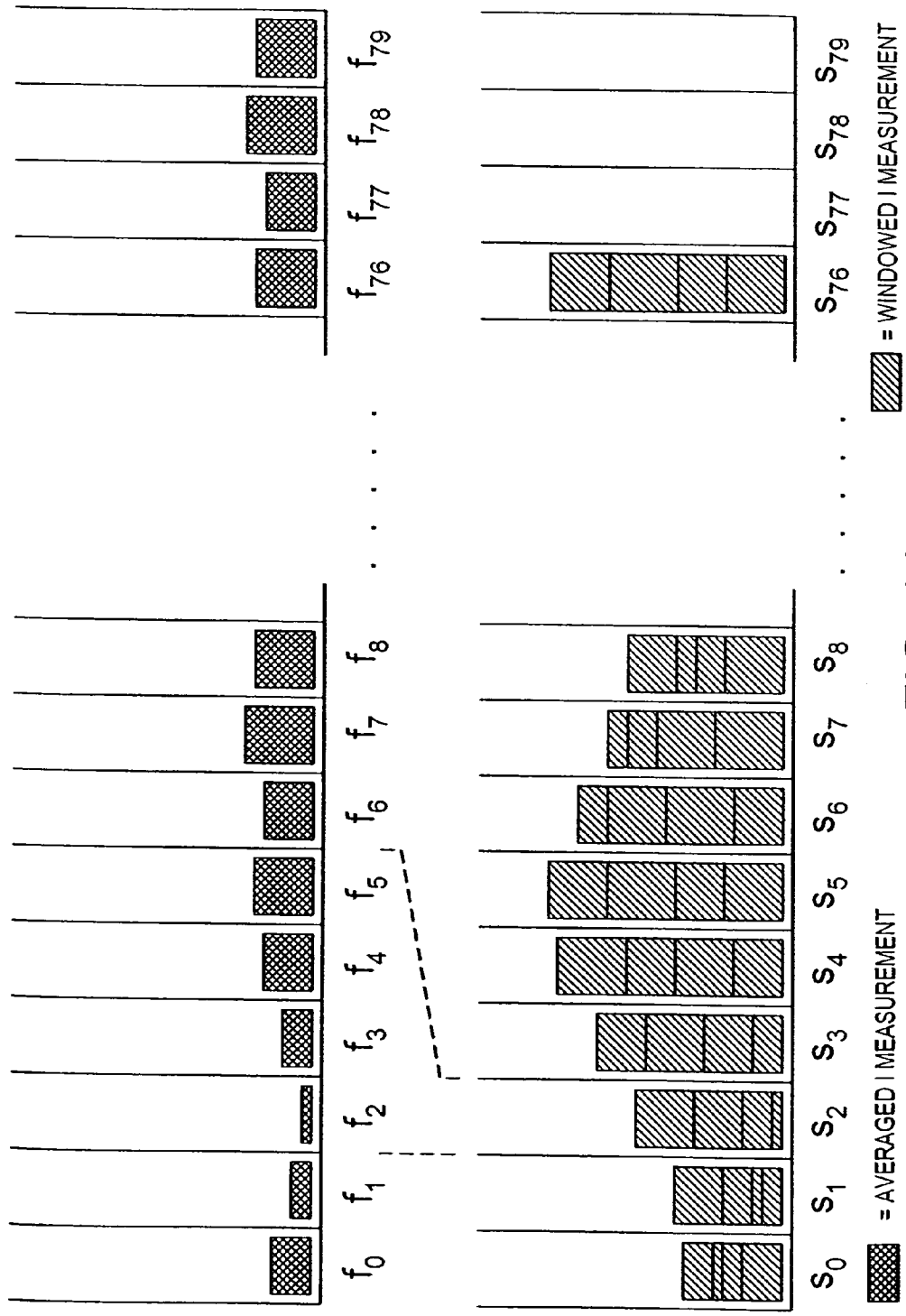
FIG. 14 shows an example of channel windowing.

The measurement results can be further processed by channel windowing so that it is possible to take into account the BT 2.0 channel width, which might differ from the channel measurement resolution. The window for channel windowing can be, for example, a slide average window, which is originally slid through the measurement data of 1 MHz resolution. The width of the sliding window can be, for example, the same as the channel bandwidth of the BT 2.0 channels. An example of channel windowing, which is used in channel measurements, is shown in FIG. 14. It is also possible to utilize different weighting for adjacent channels or the whole set of channels, if so desired. Because of channel selection filtering, interference in adjacent channels is usually not as significant as interference in the channels that are in use. In FIG. 14, the I value as processed by channel windowing is denoted by $$s_i = \sum_{k=0}^{N-1} I_{f(i+k)}$$

where N is the number of frequency channels over which channel windowing is carried out. With N=4, $s_2$ is the channel-windowing average value of I over $f_2$, $f_3$, $f_4$ and $f_5$, for example.

As shown in FIG. 14, $s_0$ has the lowest level of interference. Thus, any one of the channels $f_0$, $f_1$, $f_2$, and $f_3$ can be used for BT 2.0 transmission because $s_0$ is the sum of interference in those channels. For that reason, the sum of interference after channel 76 is not available.

FIG. 15a shows the time slots for transmission with regard to a synchronized BT 2.0 subnet, wherein one of the slave devices is the assigned temporary master. In FIG. 15a, PM denotes the master-to-slave time slot in the BT 1.0 mode, S1 and S3 denotes the slave-to-master time slots designated for the respective slave devices in the BT 1.0 mode. HV3 denotes a High quality Voice packet type usually used for voice transmission. HM is the temporary master in the BT 2.0 subnet, and HR represents the high rate mode specified by the BT 2.0 mode. With the SNIFF mode, the HM sniffs on specified time slots for its message, rather than listening on every slot of the message for HM originated from the original master.

FIG. 15b shows the time slots for transmission with regard to a piconet, wherein the master can establish both the BT 2.0 and BT 1.0 connection links with the slave devices. In FIG. 15b, S1 and S3 denotes the slave-to-master time slots for the respective slave devices connected in the BT 1.0 fashion, and T1 and T2 denotes the time slots regarding the BT 2.0 connection link.

FIG. 15c shows the network configuration with regard to a spun-off BT 2.0 subnet and the remaining piconet, as shown in FIG. 1h. The master of the spun off BT 2.0 is denoted by HM1 and the original master device is denoted by HM0. The packet types for the piconet is of an Asynchronous Connection-Less (ACL) link.

Figure 16:
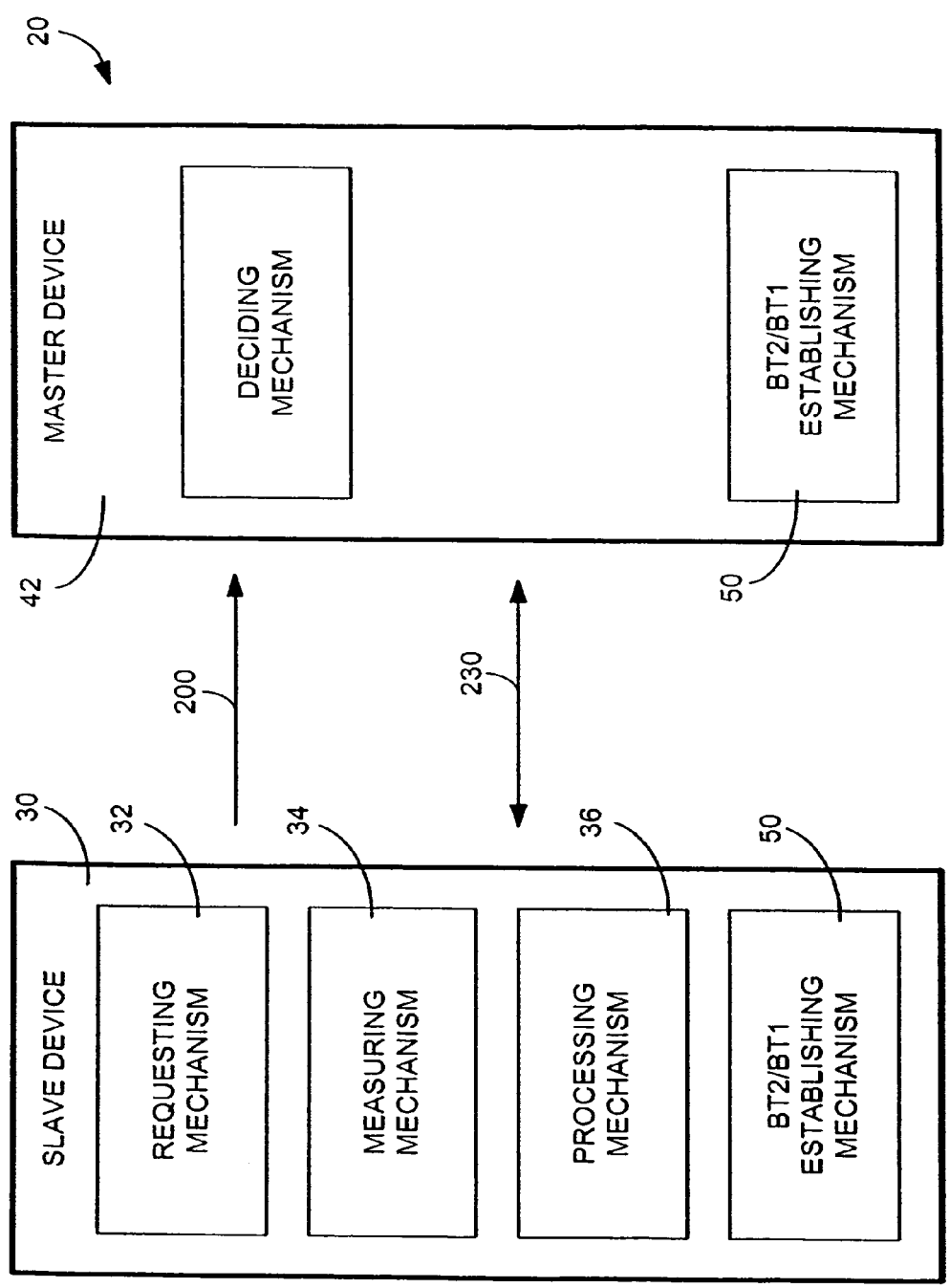
FIG. 16 is a block diagram illustrating a system for the adaptive allocation of transmission channels.

FIG. 16 is a block diagram illustrating a system 20 for the allocation of adaption transmission channels. As shown in FIG. 16, the system 20 includes a plurality of mechanisms included in the electronic devices in a piconet. In particular, a slave device 30 includes a requesting mechanism 32 for sending a request 200 (see FIG. 1a) to a master device 40, requesting the establishment of a BT 2.0 connection link. The master device includes a deciding mechanism 42 for determining whether it is able to support a BT 2.0 connection link, at least at the time of request. The slave device further includes a mechanism 34 for channel measurements, a mechanism 36 for processing the measurement results and reporting the measurement results to the master device. Preferably, the slave device also includes a mechanism 38 to recognize that the master device fails to respond to the request. Both the master device and the slave device also include a mechanism 50 for establishing a BT 2.0 or BT 1.0 connection link. As shown in FIG. 16, other messages 230, such as the response 202 in FIG. 1b, and the response 204 in FIG. 1c, can also be sent from one device to another.

Although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. A method of communications between slave devices in a communication network having a master device, the slave devices including a first slave device and a second device, said method comprising the steps of:

establishing a frequency-hopping connection link between the first slave device and the master device, and between the second slave device and the master device;

establishing a non-frequency-hopping connection link between the first slave device and the second slave device if said non-frequency-hopping connection link is available; and maintaining the frequency-hopping connection link, if said non-frequency-hopping connection link is unavailable.

2. The method of claim 1, wherein the communication network has a plurality of frequency channels for establishing the connection links, said method further comprising the step of measuring channel conditions in at least a portion of the plurality of frequency channels for determining whether said non-frequency-hopping connection link is available based on the measured conditions.

3. The method of claim 2, wherein the channel conditions include carrier power of the measured channel, and interference and noise levels affecting the non-frequency-hopping connection link.

4. The method of claim 2, wherein the measurement of the channel conditions is carried out by the first slave device.

5. A method of communications between slave devices in a communication network, said method comprising the steps of:

establishing a non-frequency-hopping connection link between a first slave device and a second slave device if said non-frequency-hopping connection link is available; and establishing or maintaining a frequency-hopping connection link, said non-frequency-hopping connection link is unavailable, wherein the communication network has a plurality of frequency channels for establishing the connection links, said method further comprising the step of:

measuring channel conditions in at least a portion of the plurality of frequency channels for determining whether said non-frequency-hopping connection link is available based on the measured conditions, wherein the measurement of the channel conditions is carried out by the first slave device, said method further comprising the step of providing the first slave device a plurality of measurement parameters, including measurement time and frequencies to be measured, wherein the first slave device measures the channel conditions based on the measurement parameters.

6. A method of communications between slave devices in a communication network, said method comprising the steps of:

establishing a non-frequency-hopping connection link between a first slave device and a second slave device if said non-frequency-hopping connection link is available; and establishing or maintaining a frequency-hopping connection link, said non-frequency-hopping connection link is unavailable, wherein the communication network has a plurality of frequency channels for establishing the connection links, said method further comprising the step of:

measuring channel conditions in at least a portion of the plurality of frequency channels for determining whether said non-frequency-hopping connection link is available based on the measured conditions, wherein the measurement of the channel conditions is carried out by the first slave device, and wherein the communications network comprises a master device for communicating with the slave devices, said method further comprising the step of providing the master device a measurement report including results of the channel condition measurements.

7. The method of claim 6, further comprising the step of selecting a frequency for establishing said non-frequency-hopping connection link based on the measurement report.

8. The method of claim 7, further comprising the step of providing the first slave device and the second slave device a plurality of channel parameters including the selected frequency.

9. The method of claim 8, wherein the channel parameters further include a modulation code rate.

10. The method of claim 8, wherein the channel parameters further include a quality of service requirement.

11. The method of claim 6, wherein whether the frequency channel for said non-frequency-hopping connection link is available is also determined based on transmission power of the first slave device.

12. The method of claim 6, wherein whether the frequency channel for said non-frequency-hopping connection link is available is also determined based on transmission power of the second slave device.

13. The method of claim 6, wherein the communication network has a master device for communicating with the slave devices, said method further comprising the step of the first slave device sending a request to the master device requesting establishment of said non-frequency-hopping connection link.

14. A system for adaptive allocation of communications channels between two slave devices in a communications network having a master device, said system comprising:

a first mechanism for establishing a frequency hopping connection between a first slave and the master device, and between a second slave and the master device; and a second mechanism for determining whether a non-frequency-hopping connection link between the first slave device and the second slave device is available;

a third mechanism for establishing the non-frequency hopping connection link between the first slave device and the second slave device if the non-frequency-hopping connection link is available; and maintaining the frequency hopping connection link between the first slave device and the second slave device the non-frequency-hopping connection link is unavailable.

15. The system of claim 14, wherein the communications network has a plurality of frequency channels for establishing the communication links, and wherein the first mechanism determines whether the non-frequency-hopping connection link is available based on channel conditions including carrier power of the frequency channels and interference and noise levels, which may affect the non-frequency-hopping connection link, said system further comprising a fourth mechanism for measuring the channel conditions.

16. The system of claim 15, wherein the channel conditions are measured based on a plurality of measurement parameters including measurement time and frequencies to be measured.

17. A system for adaptive allocation of communications channels between two slave devices in a communications network, said system comprising:

a first mechanism for determining whether a non-frequency-hopping connection link between a first slave device and a second slave device is available;

a second mechanism for establishing the non-frequency hopping connection link between the first slave device and the second slave device if the non-frequency-hopping connection link is available; and a third mechanism for establishing or maintaining a frequency hopping connection link between the first slave device and the second slave device the non-frequency-hopping connection link is unavailable, wherein the communications network has a plurality of frequency channels for establishing the communication links, and wherein the first mechanism determines whether the non-frequency-hopping connection link is available based on channel conditions including carrier power of the frequency channels and interference and noise levels, which may affect the non-frequency-hopping connection link, said system further comprising a fourth mechanism for measuring the channel conditions, and wherein the communications network comprises a master device for communicating with the slave devices, said system further comprising a further mechanism for providing the master device a measurement report including results of the channel condition measurements for allowing the master device to select a frequency for establishing said non-frequency-hopping connection link based on the measurement report.

18. The system of claim 17, wherein the first mechanism determines whether the communication channel for the non-frequency-hopping connection link is available also based on transmission power of the first slave device.

19. The system of claim 17, wherein the first mechanism determines whether the communication channel for the non-frequency-hopping connection link is available also based on transmission power of the second slave device.

20. A slave device in a communications network, the communication network comprising a master device and a further slave device for communicating with the slave device, said slave device comprising:
- a linking mechanism for establishing a frequency hopping connection link between the slave device and the master device, and between the further slave device and the master device; and
- a request mechanism for requesting a non-frequency hopping connection link between the slave device and the further slave device; wherein
- the linking mechanism
  - establishes said non-frequency hopping connection link between the slave device and the further slave device if said non-frequency hopping connection link is available, and
  - maintaining the frequency hopping connection link if said non-frequency hopping connection link is unavailable.

21. The slave device of claim 20, wherein the communications network has a plurality of frequency channels for establishing the non-frequency hopping connection link, said device further comprising
- a measurement mechanism for measuring channel conditions in at least a part of the plurality of frequency channels for determining whether said non-frequency hopping connection link is available based on the measured conditions.

22. The slave device of claim 20, wherein the communications network comprises a master device for communicating with the slave device and the further slave device, and wherein the request for establishing the non-frequency hopping connection link is carried out through the master device.

23. A slave device in a communications network, the communication network comprising a further slave device for communicating with the slave device, said slave device comprising:
- a request mechanism for requesting a non-frequency hopping connection link between the slave device with the further slave device; and
- a linking mechanism for
  - establishing said non-frequency hopping connection link to the further slave device if said non-frequency hopping connection link is available, and
- establishing a frequency hopping connection link to the further slave device if said non-frequency hopping connection link is unavailable, wherein the communications network comprises a master device for communicating with the slave device and the further slave device, and wherein the request for establishing the non-frequency hopping connection link is carried out through the master device, and wherein the communications network has a plurality of frequency channels for establishing the non-frequency hopping connection link, said device further comprising
  - a measurement mechanism for measuring channel conditions in at least a part of the plurality of frequency channels; and
  - a reporting mechanism for reporting a measurement report including results of the measured conditions to the master device so as to allow the master device to select a frequency channel for establishing said non-frequency hopping connection link based on the measurement report.

\* \* \* \* \*